United States Patent
Lin et al.

(10) Patent No.: US 10,086,293 B2
(45) Date of Patent: Oct. 2, 2018

(54) SYSTEMS AND METHODS THAT ENABLE CUSTOMIZABLE TEAMS FOR MULTI-PLAYER ONLINE GAMES

(71) Applicant: RIOT GAMES, INC., Los Angeles, CA (US)

(72) Inventors: Jeffrey Lin, Los Angeles, CA (US); Tom Cadwell, Santa Monica, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 14 days.

(21) Appl. No.: 15/601,457

(22) Filed: May 22, 2017

(65) Prior Publication Data

US 2018/0001210 A1    Jan. 4, 2018

Related U.S. Application Data

(63) Continuation of application No. 13/973,829, filed on Aug. 22, 2013, now Pat. No. 9,687,745.

(51) Int. Cl.
| | |
|---|---|
| A63F 9/24 | (2006.01) |
| A63F 13/795 | (2014.01) |
| A63F 13/352 | (2014.01) |
| A63F 13/798 | (2014.01) |
| A63F 13/822 | (2014.01) |
| A63F 13/87 | (2014.01) |

(52) U.S. Cl.
CPC .......... *A63F 13/795* (2014.09); *A63F 13/352* (2014.09); *A63F 13/798* (2014.09); *A63F 13/822* (2014.09); *A63F 13/87* (2014.09)

(58) Field of Classification Search
CPC ...... A63F 13/795; A63F 13/352; A63F 13/87; A63F 13/798; A63F 13/822
See application file for complete search history.

(56) References Cited

U.S. PATENT DOCUMENTS

| | | | |
|---|---|---|---|
| 2004/0097287 A1* | 5/2004 | Postrel | G07F 17/32 463/41 |
| 2005/0192097 A1* | 9/2005 | Farnham | A63F 13/12 463/42 |
| 2007/0173323 A1* | 7/2007 | Johnson | A63F 13/12 463/42 |
| 2008/0242420 A1 | 10/2008 | Graepel et al. | |
| 2011/0035392 A1 | 2/2011 | Cheaz | |

(Continued)

OTHER PUBLICATIONS http://www.wowwiki.com/Dungeon_Finder printed on Oct. 28, 2013, pp. 1-6.

(Continued)

*Primary Examiner* — Dmitry Suhol
*Assistant Examiner* — Carl V Larsen
(74) *Attorney, Agent, or Firm* — One LLP; Joseph K. Liu

(57) ABSTRACT

The field of the invention relates to multi-user online gaming systems, and more particularly to systems and methods that enable customizable teams for online active games. In an embodiment, the system includes an online game session server system communicatively coupled to a network for access by a plurality of users to establish a plurality of real-time interactive games sessions, wherein each game session includes at least one team and wherein the at least one team may be established in accordance with a preferred composition defined by a user.

17 Claims, 29 Drawing Sheets

(56) References Cited

U.S. PATENT DOCUMENTS

| | | |
|---|---|---|
| 2012/0172098 A1 | 7/2012 | Baker et al. |
| 2013/0143669 A1 | 6/2013 | Muller |
| 2014/0025732 A1 | 1/2014 | Lin et al. |
| 2014/0068661 A1* | 3/2014 | Gates, III ............ H04N 21/458 725/34 |
| 2014/0120993 A1 | 5/2014 | Tsuchiya |
| 2015/0038233 A1* | 2/2015 | Rom ..................... A63F 13/42 463/42 |

OTHER PUBLICATIONS http://www.wowwiki.com/Raid_Finder printed on Oct. 28, 2013, pp. 1-4.
http://us.battle.net/wow/en/blog/2568337 printed on Oct. 28, 2013, pp. 1-9.
http://us.battle.net/wow/en/blog/3608426 printed on Oct. 28, 2013, pp. 1-8.

* cited by examiner

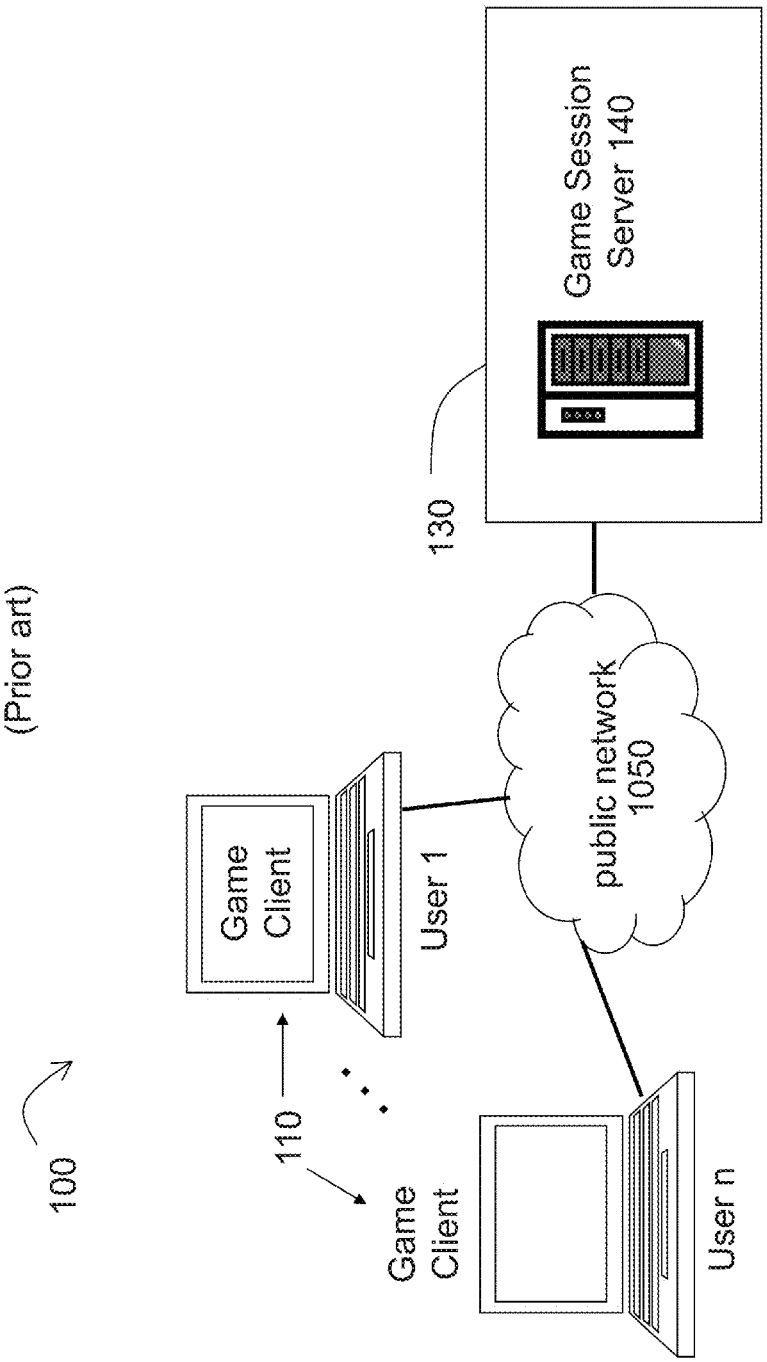

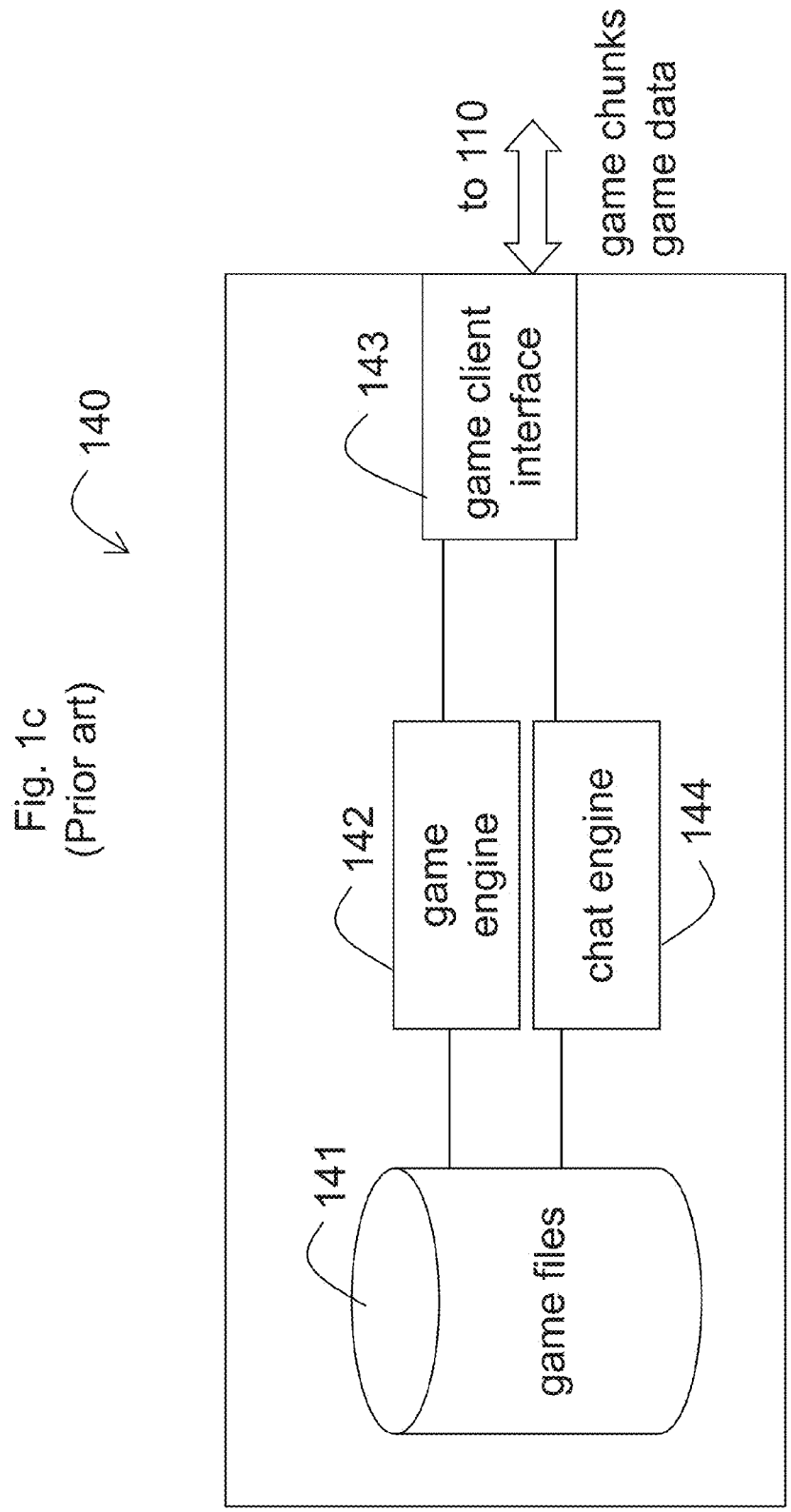

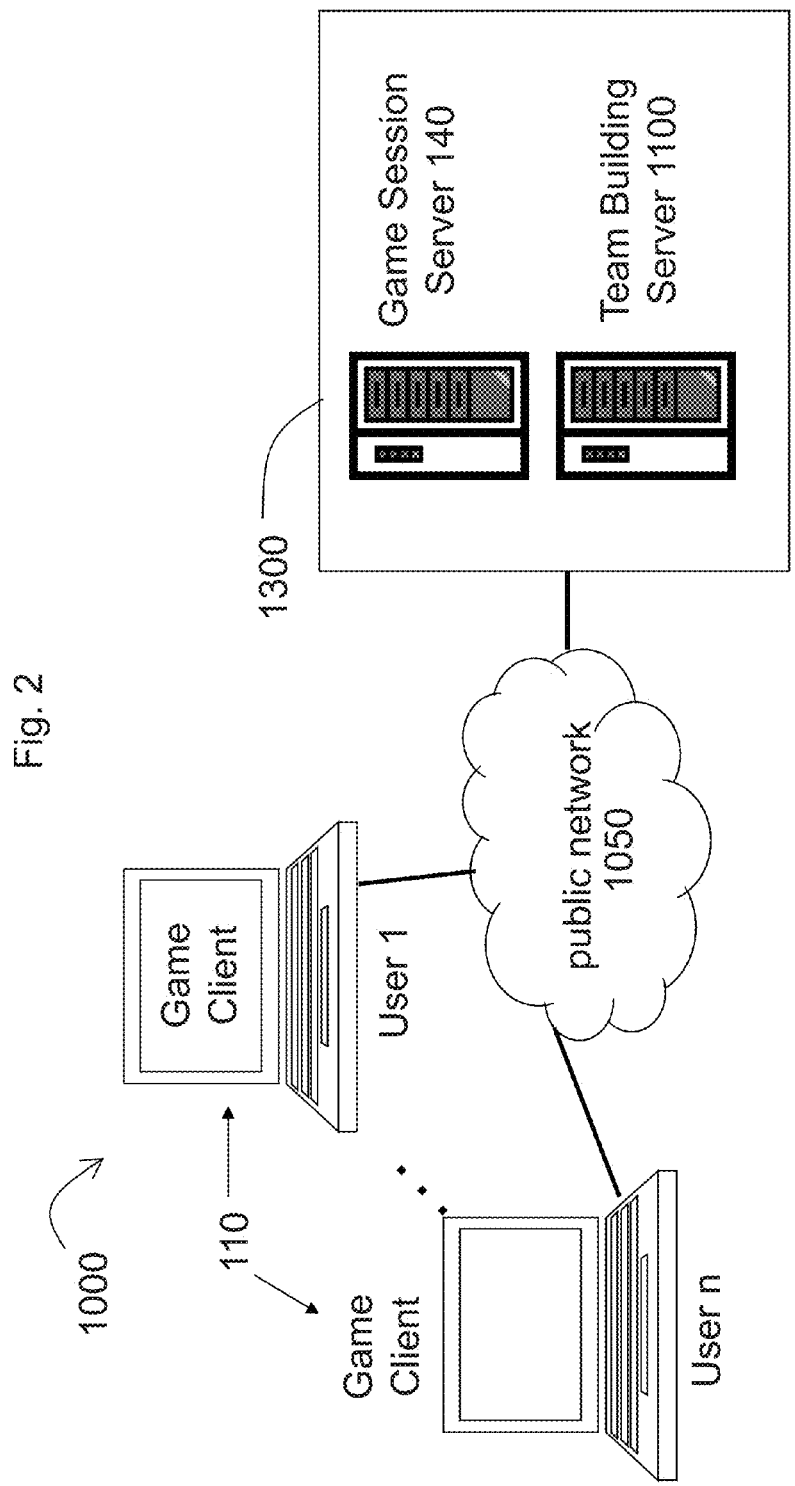

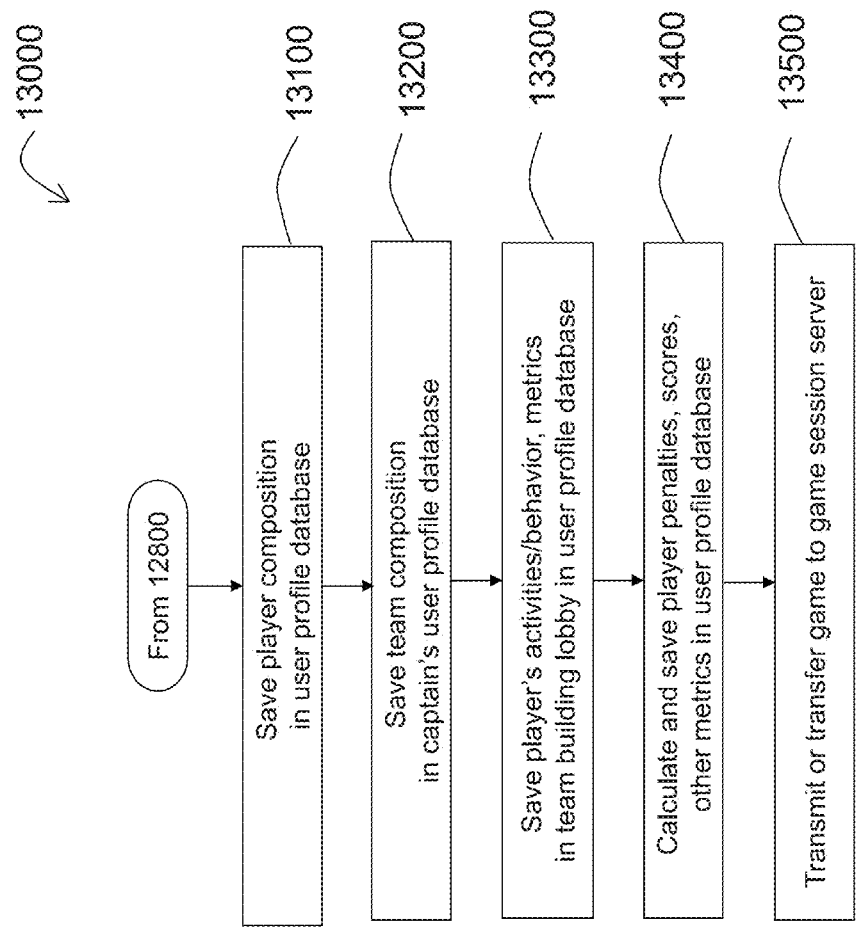

US 10,086,293 B2

SYSTEMS AND METHODS THAT ENABLE CUSTOMIZABLE TEAMS FOR MULTI-PLAYER ONLINE GAMES

CROSS REFERENCE TO RELATED APPLICATION

This application is a continuation of U.S. patent application Ser. No. 13/973,829 filed Aug. 22, 2013, which is hereby incorporated by reference in its entirety.

FIELD OF THE INVENTION

The field of the invention relates to multi-user online gaming systems, and more particularly to systems and methods that enable customizable teams for multi-user online games.

BACKGROUND OF THE INVENTION

For competitive, multi-player online games, such as League of Legends from Riot Games ("http://www.leagueoflegends.com/"), one important aspect to a player's experience (positively or negatively) is team composition. Ideally, the player's team is composed of good, sportsman-like players that complement each other well. On the other hand, a player's experience may turn negative if teammates begin fighting with one another. For instance, two players may fight over a particular avatar (or "champion") or over a particular role available to only one player on the team in an ideal team composition. Such conflict may create a negative experience even before a particular game starts. Accordingly, a system that reduces the risk of such conflict may be desirable.

SUMMARY OF THE INVENTION

The field of the invention relates to multi-user online gaming systems, and more particularly to systems and methods that enable customizable teams for online active games.

In an embodiment, the system includes an online game session server system communicatively coupled to a network for access by a plurality of users to establish a plurality of real-time interactive games sessions, wherein each game session includes at least one team and wherein the at least one team may be established in accordance with a preferred composition defined by a user.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1a is an exemplary diagram of a multiuser online game system known in the art;

FIG. 1c is an exemplary diagram of a game session server known in the art;

FIG. 2 is an exemplary diagram of a multi-user online game system according to an embodiment of the present invention;

FIG. 4e is another exemplary Team Builder Lobby user interface according to an embodiment of the present invention;

FIG. 13 is another electronic process enabling team building for multiuser online games according to an embodiment of the present invention.

DETAILED DESCRIPTION OF THE PREFERRED EMBODIMENTS

State of the Art Systems

Figure 1B:
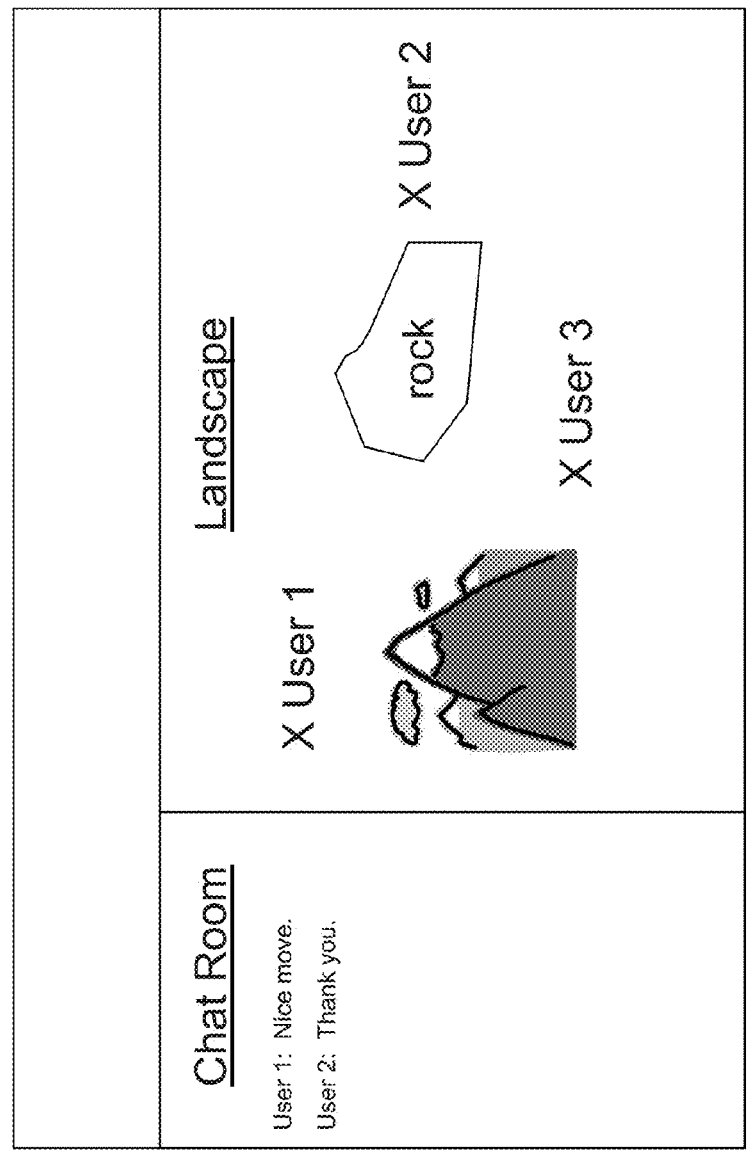
FIG. 1b is an exemplary user interface known in the art.

Turning to FIG. 1a, a large multiuser online game system 100 over a network 1050, such as the Internet, is shown. An example of such a game system 100 known in the art is League of Legends (www.leagueoflegends.com). League of Legends is a session-based, multiplayer online battle-arena game where rival teams compete against one another for victory on highly stylized battlefields and landscapes, also referred to as maps.

Users can install a League of Legends game client on their personal computing device 110 to establish a game session over the network 1050 with the game system's 100 datacenter 130, which provides the real-time online game interaction with at least one user 110.

The datacenter 130 includes a plurality of server systems operating on a plurality of server machines communicatively coupled to each other via the network 1050 and/or a secure virtual private network (not shown). The server machines each include one or more processors, memory, an operating system, an input/output interface and network interface all known in the art. According to an embodiment, the datacenter 130 includes, among other things, a game session server system 140.

Turning to FIG. 1b, an example game client 110 user interface 120 is shown. In certain online games, each user is generally represented by a personalized graphical avatar in the user interface 120, also referred to as "champion," (shown as "X" in this example), and the game client 110 user interface 120 may show the logical position of one user's avatar, X User 1, relative to another, X User 2 and X User 3 within a virtual landscape. The game client 110 user interface 120 may also show a user's avatar logical position relative to the virtual landscape. For example, a user's avatar's position may be at bottom, middle, top, hidden, and so on. Each user's avatar is further given a role, e.g., assassin, fighter, mage, carry, support, tank, and so on. Each user's avatar may further comprise other abilities, enhancements, and levels. For example, these abilities and enhancements include "spells," "powers," "runes," and "masteries," and so on. The game client 110 user interface 120 may also include a chat interface ("Chat Room") that enables participating users to communicate with one another beyond interactions with the avatars (Xs).

Turning to FIG. 1c, a more detailed diagram of a game session server system 140 known in the art is shown. The game session server system 140 provides the game interaction with the users' game client 110 via the game client interface 143, which is generally an application interface known in the art accessible over the network 1050 by the game client 110, e.g., in a traditional client server model. A game engine 142 coupled to the game client interface 143 is included to manage the interaction between the plurality of users 110 and the game system 100. The game session server system 140 further includes a chat engine 144 known in the art that enables the various users 110 participating in a particular game session to communicate with each other via text messages. Audio, pictures, and multimedia may also be exchanged with the chat engine 144. Both the game engine 142 interactions as well as the chat messages exchanged can be recorded and stored in a game files database 141. This enables, among other things, replay and history analysis by not only the users but also the administrator and other systems.

Figure 1D:
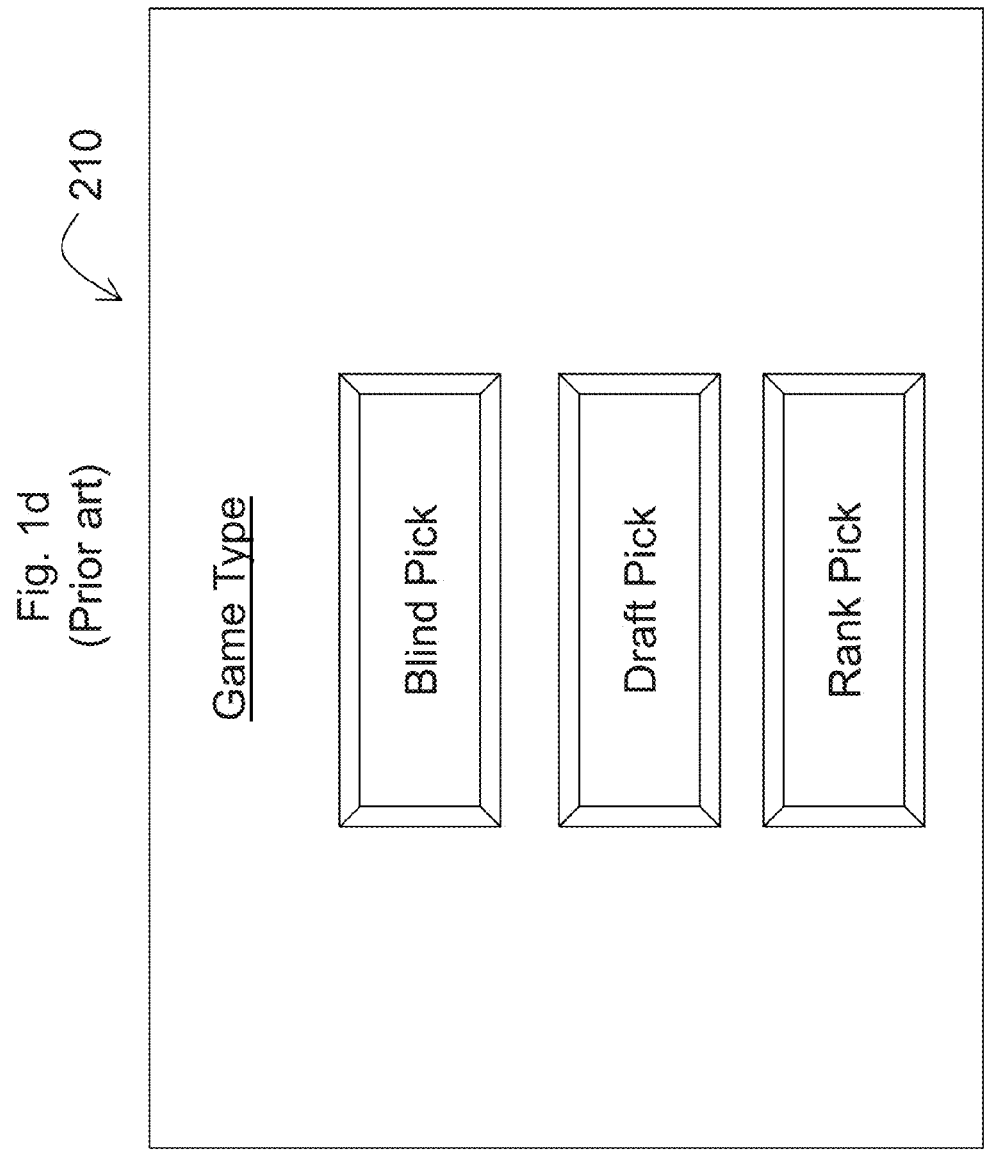
FIG. 1d is another exemplary user interface known in the art.

Turning to FIG. 1d, in the game system 100, when a user joins a game, the user must be matched with other users to team up with and/or compete against. Options for how the user is matched up with others can be displayed, as shown in the user interface 210. A user can specifically select his teammates and/or opponents, or the user can allow the system 100 to select teammates and/or opponents from a list of active users who have selected the same option. For example, in Ranked Pick, the system 100 may allow the user to select up to one additional teammate and the system 100 may match the user with other participants with similar experience and/or skill level. In Blind Pick, the user may select anywhere from none to all of the user's teammates and then the system 100 may match the user's team with random opponents. Blind Pick may also allow the user to specifically select both his teammates and the opponents. With Blind and Ranked Pick, the user may or may not know who the other participants are, and thus, the user experience may be unpredictable.

Other systems and methods for providing game system 100 are further described in U.S. patent application Ser. No. 13/551,338, entitled "SYSTEMS AND METHODS THAT ENABLE PLAYER MATCHING FOR MULTI-PLAYER ONLINE GAMES," to Lin et al., filed Jul. 17, 2012, which is hereby incorporated by reference in its entirety.

Preferred Systems

Turning to FIG. 2, an online multi-user game system 1000 according to an embodiment of the present invention is shown. The system 1000 provides a team building system as will be described below. System 1000 includes a datacenter 1300 having a game session server system 140 as described above. The system 1000 also includes game clients 110 configured to access the data center 1300 over the network as described above. According to an embodiment, the system 1000 further includes a team building server 1100, also referred to as group finder server, operatively coupled to the game session server system 140, that matches a player with other active players to form a team, also referred to as a group, and find opponents for the team for a particular game session, using the systems and methods described below. In this embodiment, a team comprises a captain and one or more team members.

Figure 3:
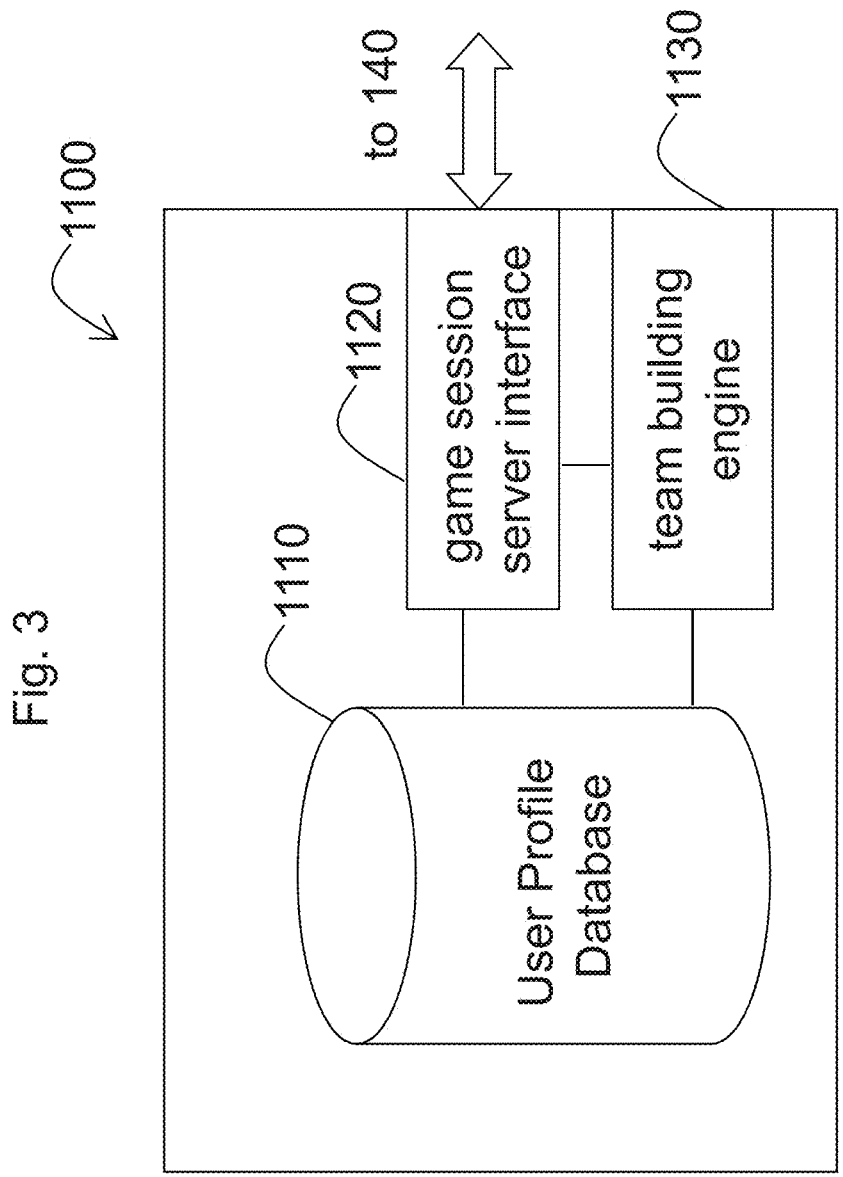
FIG. 3 is an exemplary diagram of a team building server system according to an embodiment of the present invention.

Turning to FIG. 3, a detailed diagram of a team building server 1100 is shown. The team building server 1100 includes an interface 1120 to the game session server 140.

As will be described in more detail below, the interface 1120 receives settings for a particular user from the game session server 140 to store in a user profile database 1110 as default data for that particular user. The database 1110 may be implemented with technology known in the art, such as a relational database and/or object oriented database. The team building server 1100 also includes a team building engine 1130, also referred to as group finder engine, that matches players to form teams and opponents for a particular game session, as will be described in more detail below. The team building engine 1130 is coupled to the user profile database 1110 and the game session server interface 1120.

Preferred Processes

Generally, a player may be a solo player looking for a team to join in a game session. The team building server 1100 then places such solo player in a solo queue. Such player may also be referred to as a "solo queuer." Or a player may be a captain looking for other players to form a team. A captain often pre-selects some friend players before looking for other players to fill out the rest of the team. The captain and the friends are referred to as a "premade" group. A friend may be a player that is on a pre-existing list of users associated with the captain. The captain also proposes a team composition. The team building server 1100 then attempts to match premades with solo queuers matching the proposed composition, and then finds an opponent for this team. According to an embodiment, the team building server 1100 only unlocks the team building mode for a player when the player reaches a predetermined level. When a player unlocks the team building mode, the team building server 1100 may provide a team building tutorial to the player.

Finding a Team as a Solo Queue Player

FIG. 4a through FIG. 4g show the user interfaces provided by the team building server 1100 for a solo player, also referred to as "solo queue player," to find a team. The user interfaces in FIG. 4b through 4g are also referred to as the Group Finder Lobby, or Team Building Lobby.

Figure 4A:
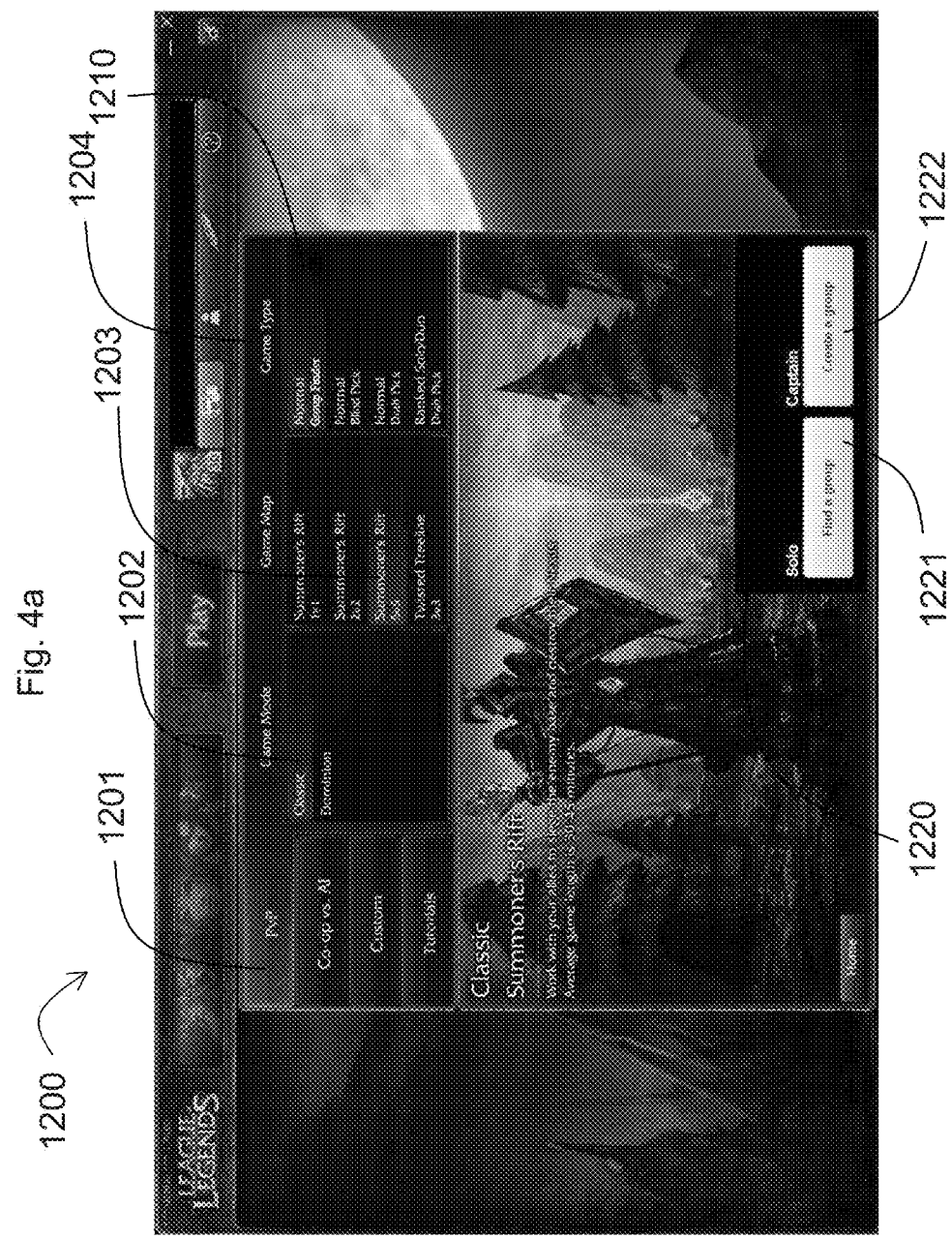
FIG. 4a is an exemplary user interface according to an embodiment of the present invention.

Turning to FIG. 4a, a user interface 1200 provided by the team building server 1100 is shown. In the user interface 1200, the player may select in the PvP ("Player versus Player") option 1201 how to play with other online players. The options include Game Mode option 1202 (e.g., Classic) and Game Map option 1203 (e.g., Summoner's Rift 5×5, which requires a team of 5 players). The user interface 1200 further provides a Group Finder button 1210 under Game Type option 1204 that a player can select to find a group (find and join and team), or create a group (build a team). When the player selects the Group Finder button 1210, the team building server 1100 provides window 1220 wherein a solo player may select a Find a Group button 1221 to find and join a team.

Figure 4B:
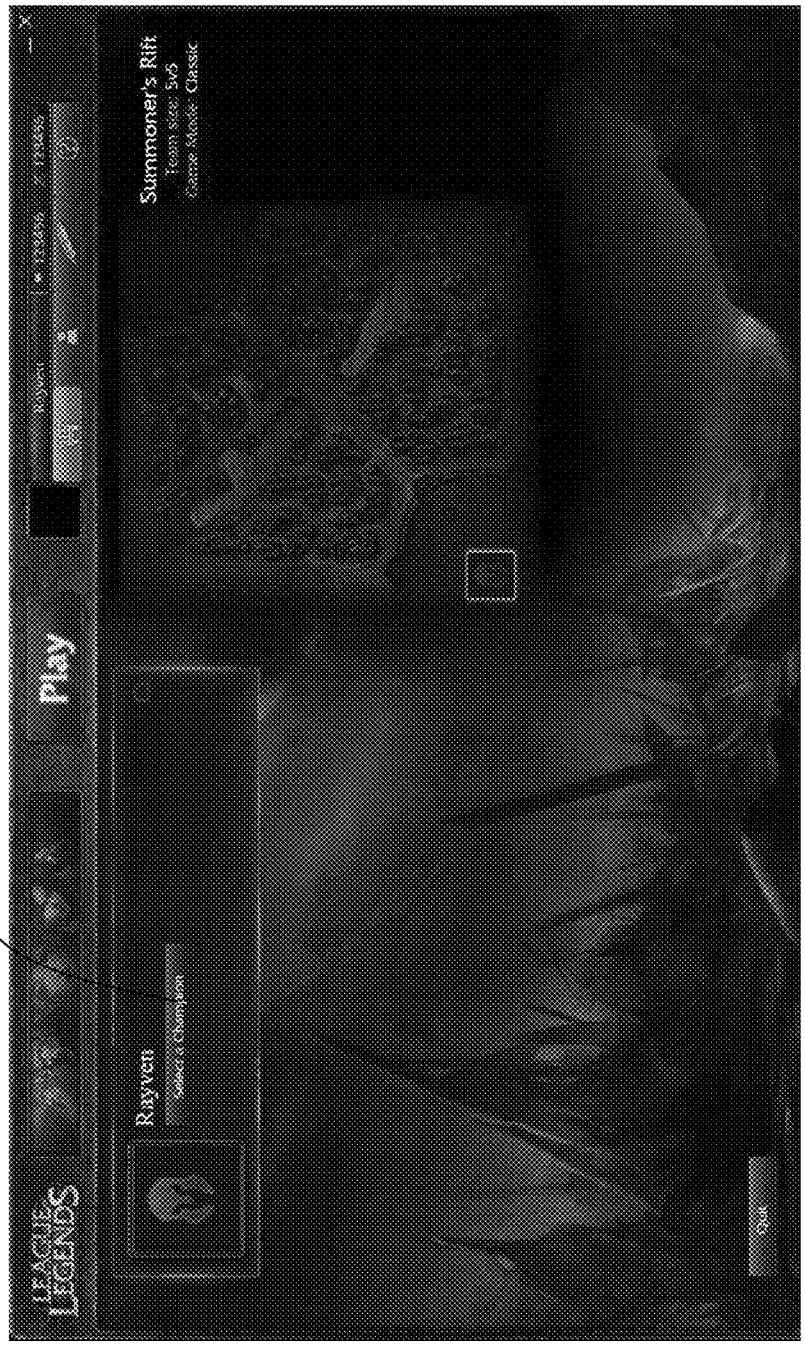
FIG. 4b is an exemplary Team Builder Lobby user interface according to an embodiment of the present invention.

Turning to FIG. 4b, a user interface 1300 provided by the team building server 1100 is shown. The user interface 1300 is provided when a solo player (e.g., Rayven) selects the Find a Group button 1221 in FIG. 4a above. The user interface 1300 provides a Select a Champion button 1310 wherein the player may select an avatar (champion).

Figure 4C:
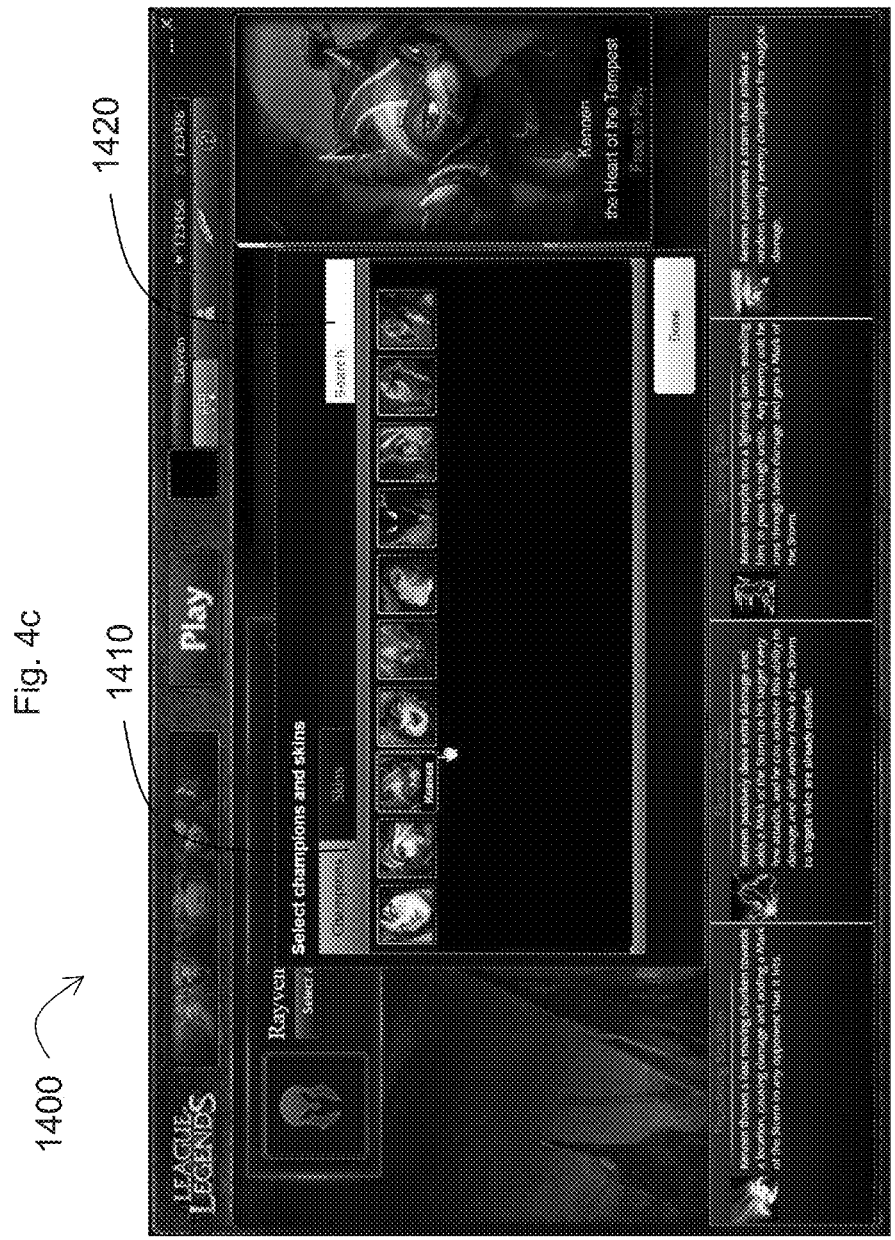
FIG. 4c is another exemplary Team Builder Lobby user interface according to an embodiment of the present invention.
Figure 4D:
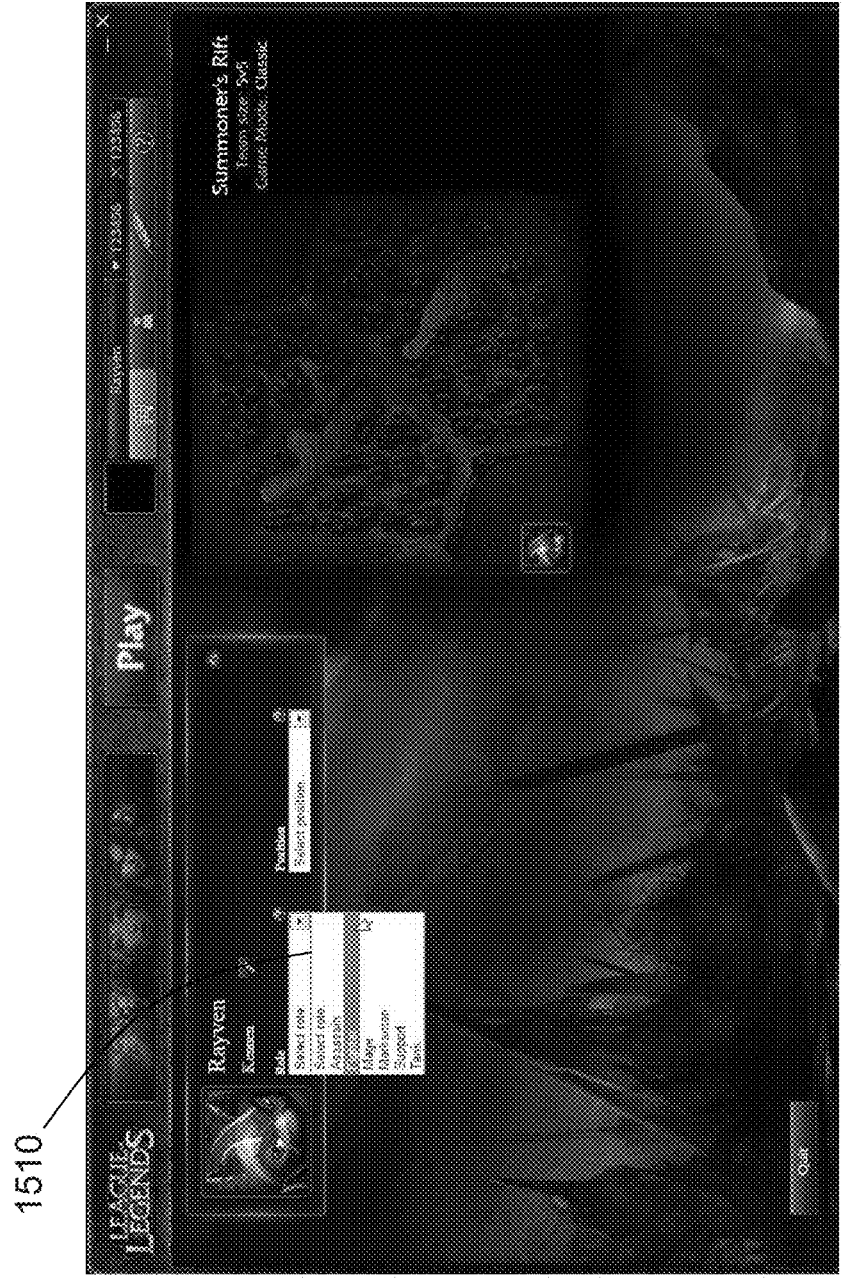
FIG. 4d is another exemplary Team Builder Lobby user interface according to an embodiment of the present invention.
Figure 4F:
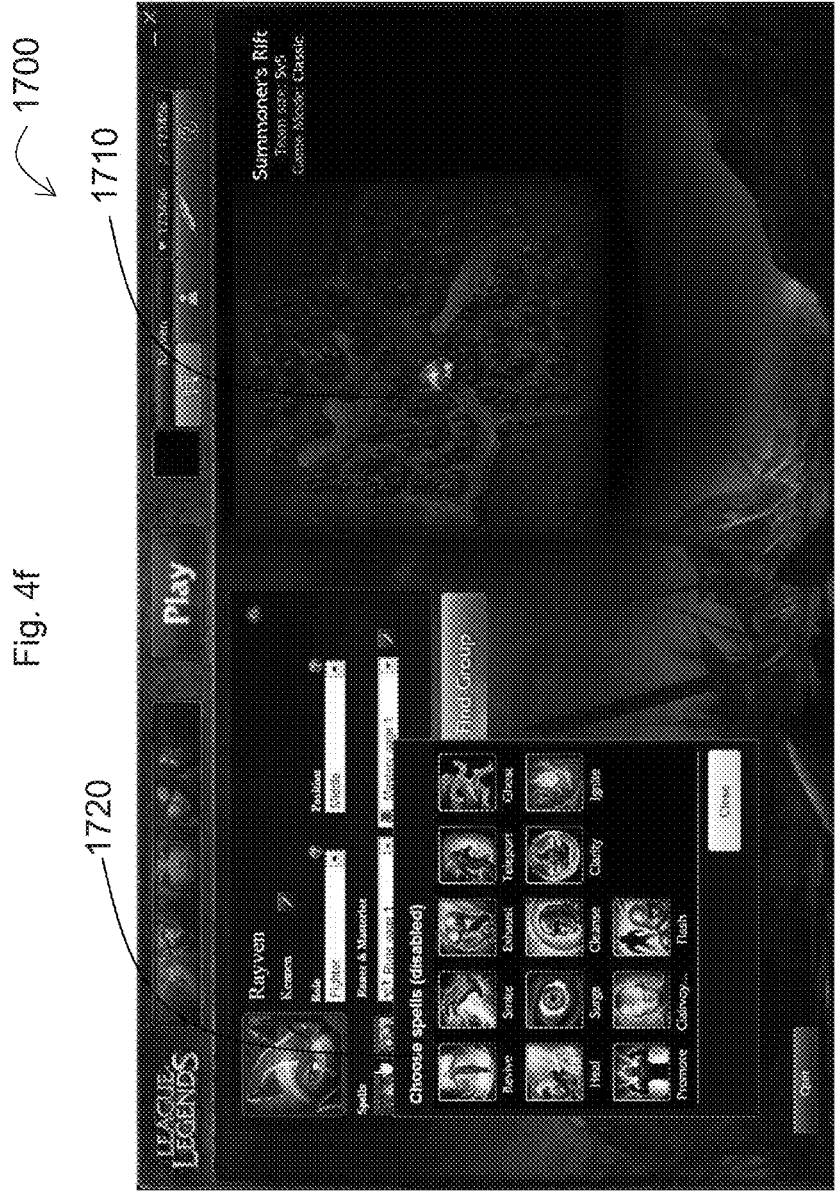
FIG. 4f is another exemplary Team Builder Lobby user interface according to an embodiment of the present invention.

Turning to FIG. 4c, a user interface 1400 provided by the team building server 1100 is shown. The user interface 1400 is provided when the player selects the Select a Champion button 1310. As a result, the user interface 1400 provides a window 1410 showing a plurality of avatars (champions) and their characteristics, and a plurality of skins (not shown) from which the player may select an avatar (e.g., Kennen) to represent the player in the game. The user interface 1400 further provides a Search function 1420 to search for a particular avatar and/or skin.

Turning to FIG. 4d to FIG. 4g, user interfaces 1500 to 1800 provided by the team building server 1100 are shown. Once the player selects an avatar and skin (FIG. 4c), the player next selects a role and a position for the avatar. The user interface 1500 (FIG. 4d) provides a menu for the player to select a role for the avatar. Examples of roles include, but not limited to:

Tank: While not the most damaging characters, tanks are durable, front-line champions that help lock down enemies and start fights. They are usually found leading the charge, choosing the right times and situations to initiate aggression. Many tanks can also protect squishier teammates by stunning or pushing around dangerous foes and limiting their damage potential.

Fighter: Fighters are durable melee combatants that focus on a mix of offense and defense. While they do not have as much utility as a tank or as much damage as an assassin, fighter damage will add up over time and make them a major threat.

Assassin: An assassin is an agile champion that specializes in seeking out weaker targets and killing them quickly and mercilessly. Focused around infiltration, deception, and high damage abilities, assassins are the lone wolves of the league who bring instant death upon weaker targets.

Mage: Mages focus on doing high ability damage at range—sacrificing defense to do so. Bringing high damage potential, utility and area-effect, mages can lock down entire areas, quickly destroy a valuable target, or capitalize on clumped-up foes to decimate the opposing team.

Support: A support is a champion who specializes in deferring some of its own power to augment the power of its allies. A support can assist its teammates by more direct means such as healing an ally or increasing that ally's damage, or can be effective by creating combat opportunities for its ally through strong control abilities. A skilled support can give its team the edge it needs to claim victory.

Marksman: A marksman is a ranged attacker that sacrifices defensive power and utility to focus on dealing continuous damage upon individual targets. Typically focused on using their basic attacks more than their abilities, marksmen scale to devastating levels of damage in the late phase of any game.

FIG. 4e shows a user interface 1600 which provides a menu 1610 for the player to select a position for the avatar in the game landscape (or map, e.g., Summoner's Rift). Examples of positions include, but not limited to, bottom, jungle, middle, and top. In the example in FIG. 4f, the player selects the middle position for the avatar. As a result, the avatar is shown in a middle position (sometime referred to as "lane") in the map 1710. The user interface 1700 in FIG. 4f further provides one or more menus 1720, each having at least one spell from which the player may select for the avatar.

Figure 4G:
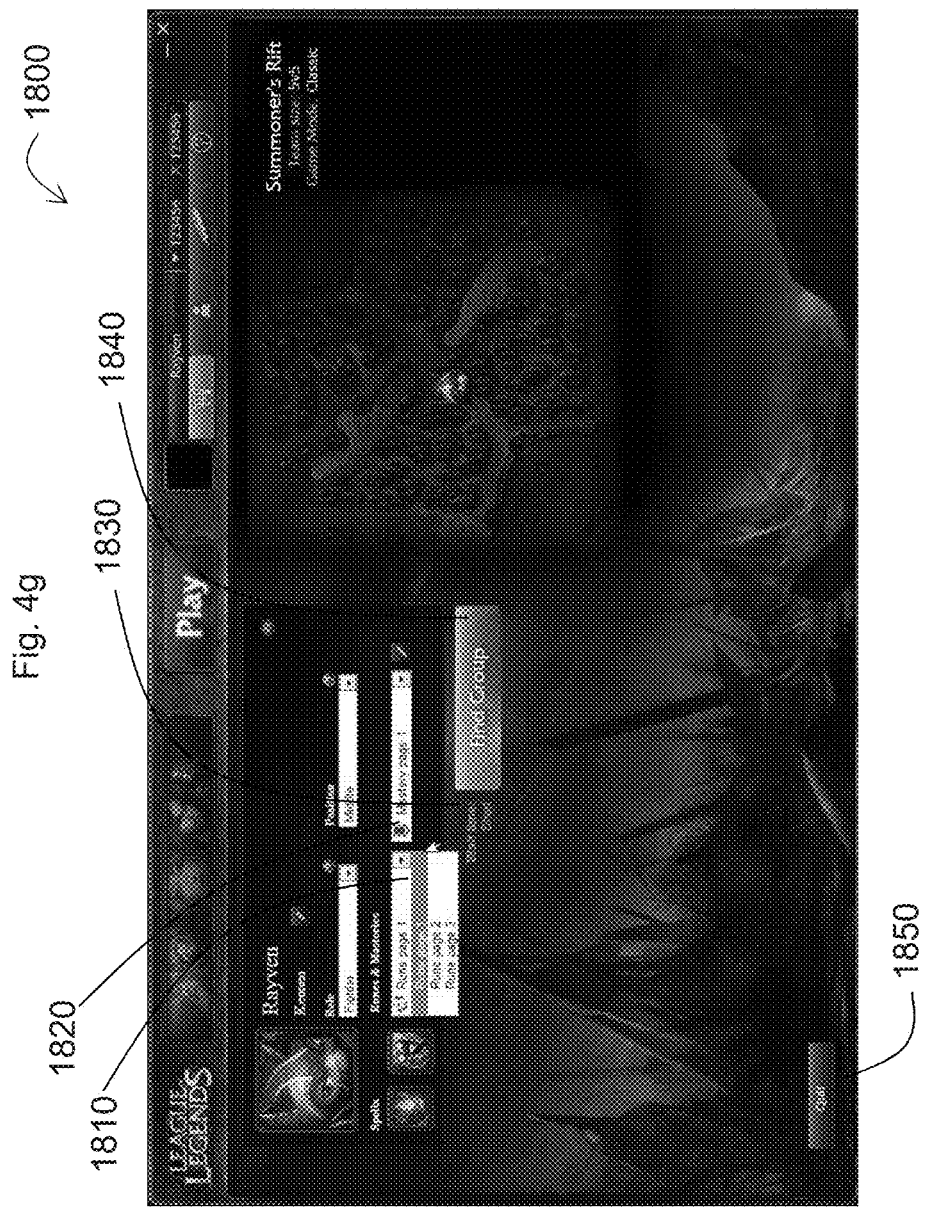
FIG. 4g is another exemplary Team Builder Lobby user interface according to an embodiment of the present invention.

FIG. 4g shows a user interface 1800 which provides a menu 1810 for the player to select a rune page for the avatar, and a menu 1820 for the player to select a mastery page for the avatar. After the player has selected the composition (champion-role-position, or champion-role-position-spells-runes-masteries, and so on) of the avatar, the team building server 1100 provides an estimated wait time (also referred to as "queue time") 1830 for the player to find a matching team to join. The estimated wait time 1830 may be pre-determined. The estimated wait time 1830 may also be calculated based on historical data. For example, the team building server 1100 may calculate an estimated wait time of 3 minutes for a solo queuer having a champion with the composition of Kennen-fighter-middle and having a certain skill level. If the player changes the champion, role or position, the team building server 1100 will update the estimated wait time. Alternatively, the team building server 1100 may calculate and provide descriptive estimated wait time such as "short," "moderate," "long," "extremely long," and so on. The player may accept the estimated wait time and select the Find Group button 1840. As a result, the team building server 1100 will place the player in the solo player queue. The player may also decide not to proceed to find a team (group) and select the Quit button 1850, which will bring the player back to the user interface 1200 (FIG. 4*a*) to attempt another team finding process. The user interfaces 1300 to 1700 also each provide a similar Quit option, which also brings the player back to the user interfaces 1200. As such, the player may quit the process at any time to restart the team finding process.

Figure 4H:
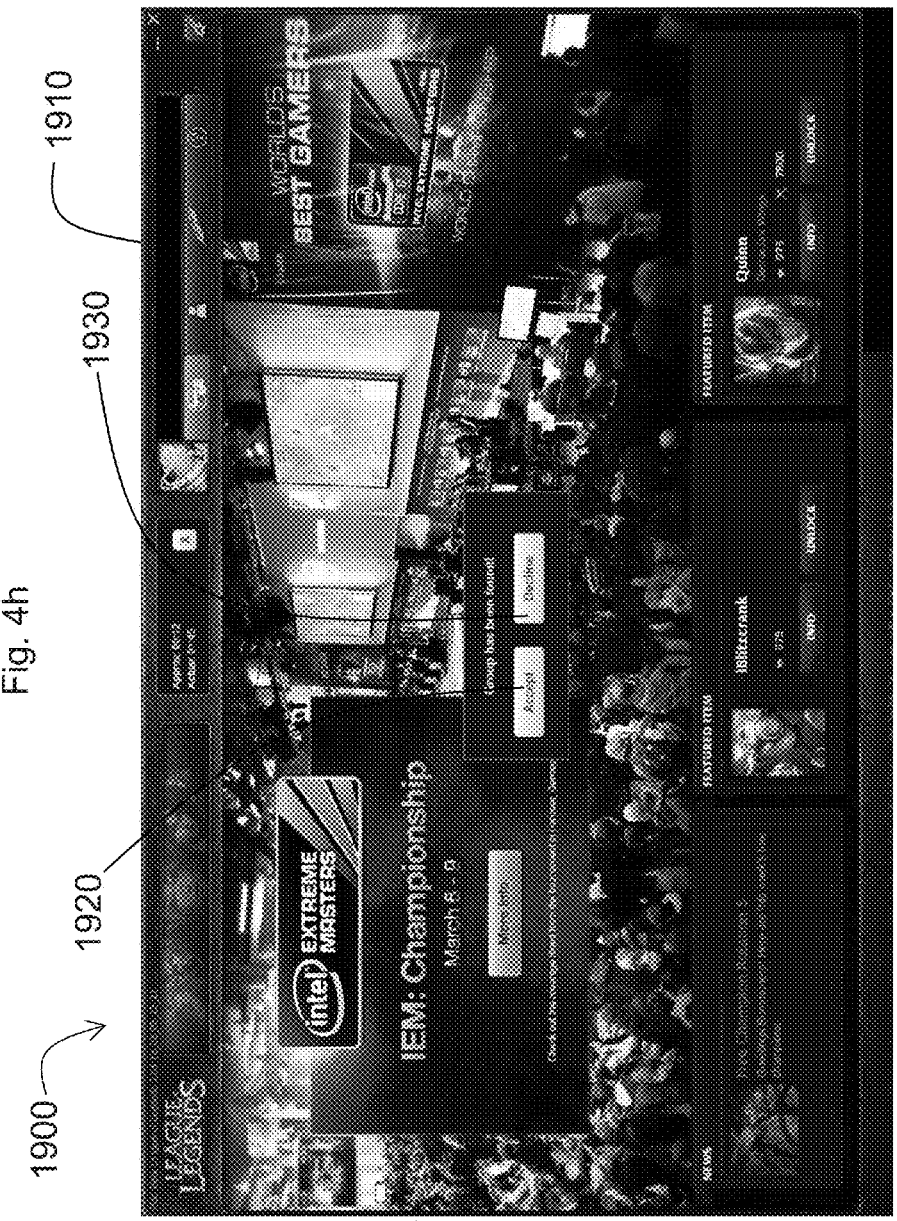
FIG. 4h is another exemplary user interface according to an embodiment of the present invention.

Turning to FIG. 4*h*, a user interface 1900 provided by the team building server 1100 is shown. After the player selects the Find Group button 1840 (FIG. 4*g*), the team building server 1100 places the player in the wait lobby 1910 while the team building server 1100 attempts to find a matching team for the player. When the team building server 1100 finds a matching team for the player, the player may either select the Accept button 1920 to accept the team, or the Decline button 1930 to decline the team.

Figure 5:
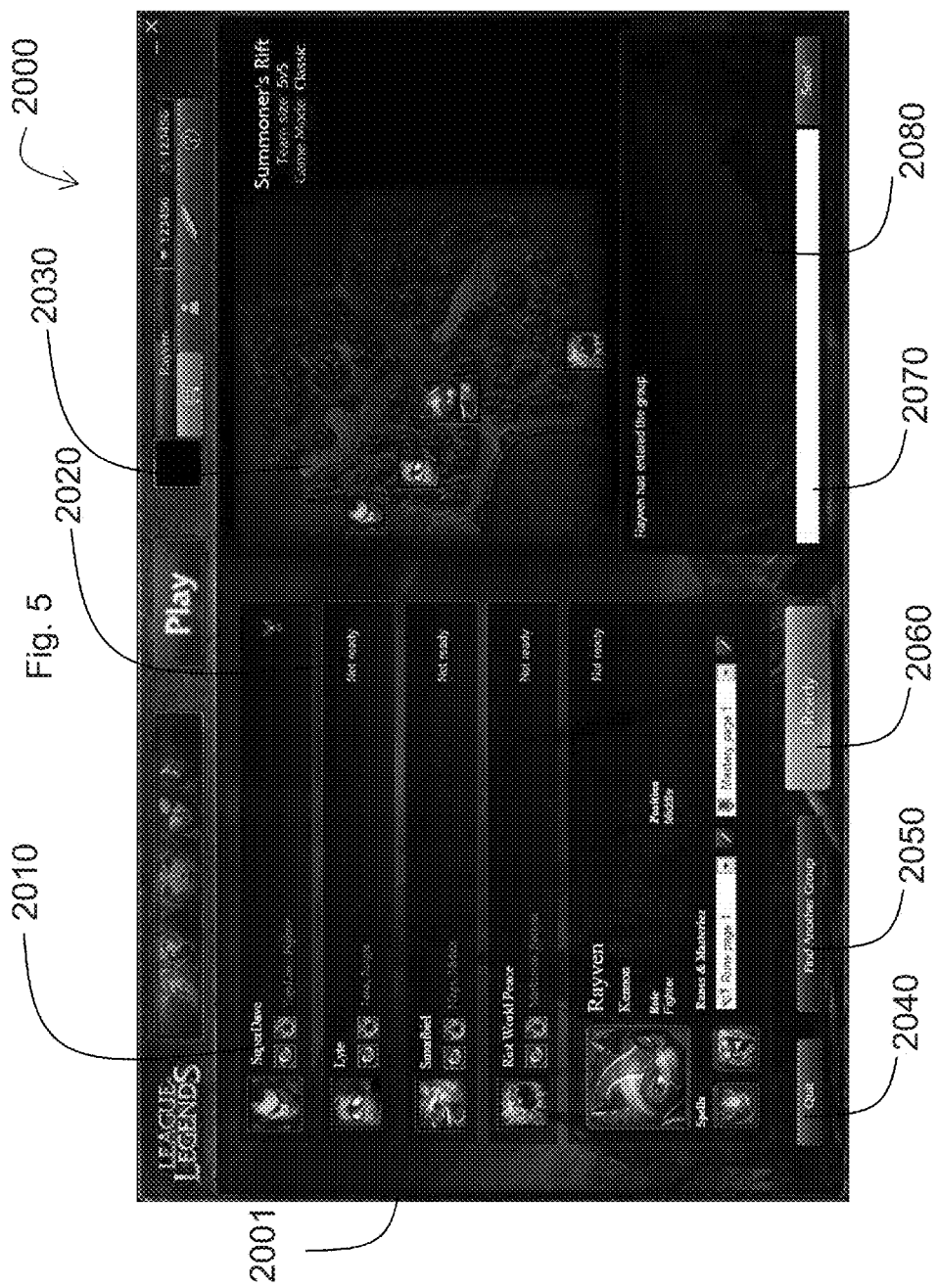
FIG. 5 is another exemplary Team Builder Lobby user interface according to an embodiment of the present invention.

Turning to FIG. 5, a user interface 2000 provided by the team building server 1100 after the player accepts the team found by the team building server 1100 (FIG. 4*h*) is shown. Generally, the user interface 2000 shows the team that the team building server 1100 found for the player. It is noted that the user interface 2000 may place the player back into the Group Finder Lobby described above. In the example in FIG. 5, the team building server 1100 has found a team with five members, including the player. The captain 2010 of the team may be shown at the top of the team member list 2001, while the players may be shown at the bottom of the team member list 2001. The champion, role, position, spells, rune, mastery, and so on, of each member player are also shown. The user interface 2000 also shows the Ready/Not Ready status 2020 of each member player. The Ready status (not shown) generally means the member player is present and ready to play. The selected position of each member player is shown in the map 2030. For example, the map 2030 shows the team having the captain at the top position, one team member in the jungle position, two team members in the middle position, and one team member in the bottom position. The player may review the information in the user interface 2000 and decide whether to Quit 2040, Find Another Group 2050, or let the team building server 1100 and other team members know that the player is Ready 2060 to play. According to an embodiment, the Ready button 2060 is not available for the player to select until all members of the team have been found, and no member has selected to quit the team.

The user interface 2000 further provides a chat function 2070 for members to chat with one another. The window 2080 shows the chat messages as well as other activities and statuses of all members.

Figure 5A:
FIG. 5a is another exemplary Team Builder Lobby user interface according to an embodiment of the present invention.

Turning to FIG. 5*a*, according to an embodiment, the system may provide and place the player in the user interface 2100 while the team building server 1100 is still attempting to find all members for the team. The user interface 2100 shows the team members that have been found, and the one or more open slots with the desired role-position 2110 that the team building server 1100 is still attempting to find.

Figure 6A:
FIG. 6a is another exemplary Team Builder Lobby user interface according to an embodiment of the present invention.
Figure 6B:
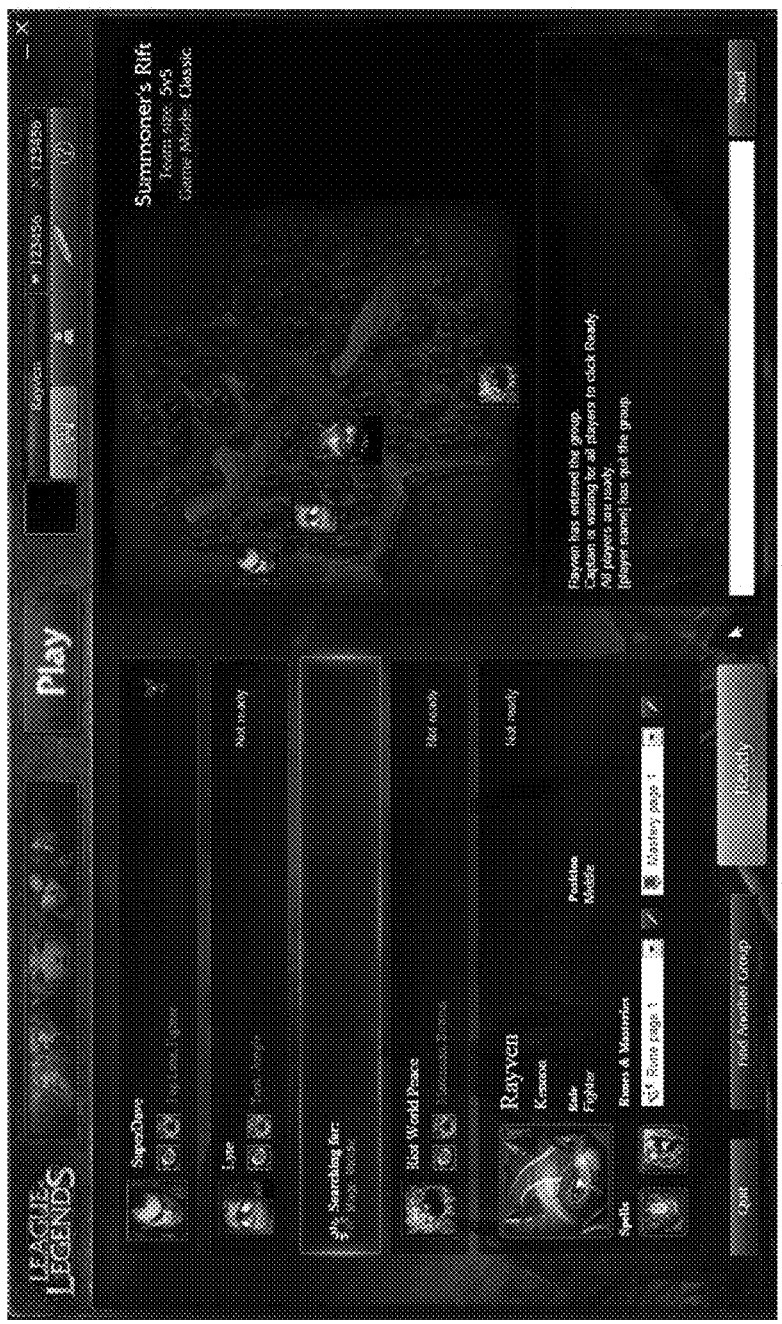
FIG. 6b is another exemplary Team Builder Lobby user interface according to an embodiment of the present invention.
Figure 6C:
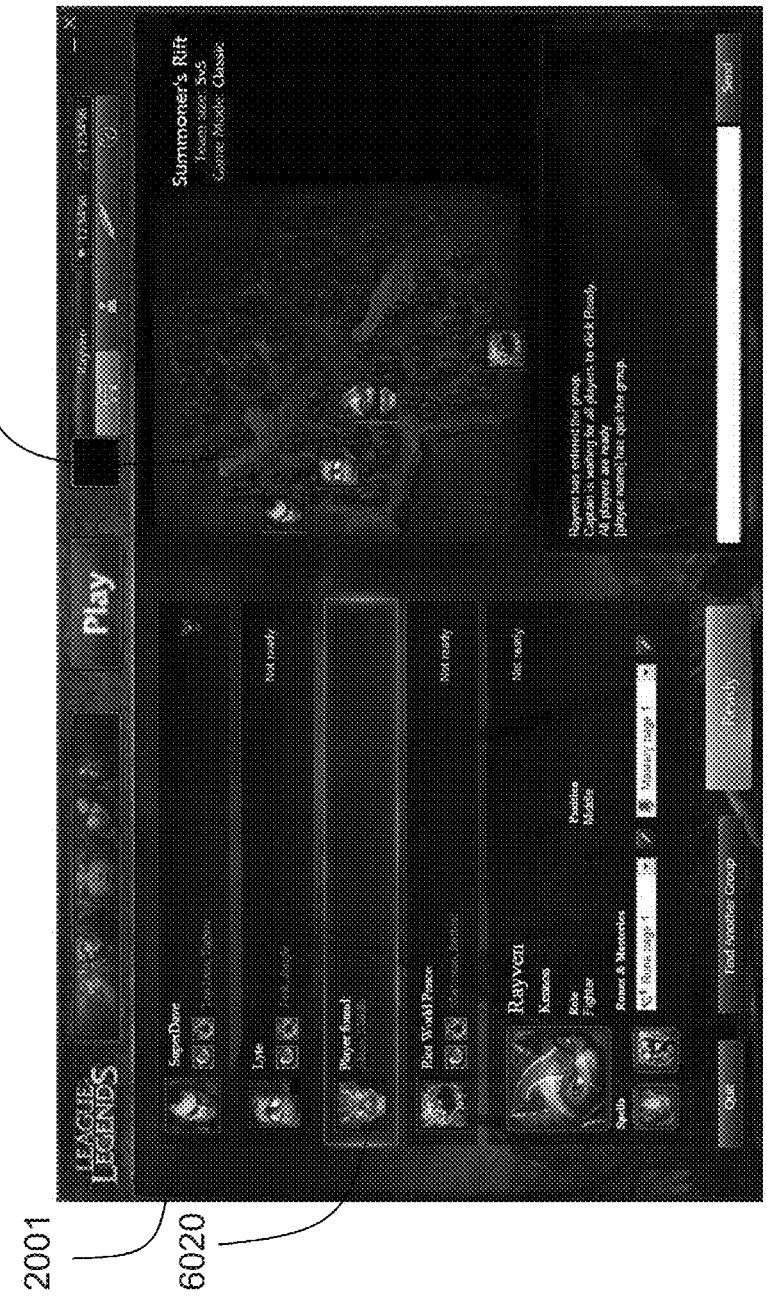
FIG. 6c is another exemplary Team Builder Lobby user interface according to an embodiment of the present invention.

Turning to FIG. 6*a* to FIG. 6*c*, as indicated above, any member of the team may select to quit the Team Builder Lobby any time before the game starts, e.g., while waiting for all members to be ready. When a member quits the team, the user interface 6000 provided by the team building server 1100 removes the champion of that member in the team member list 2001, and the window 2080 will provide an updated message showing which member has quit. The team building server 1100 may provide a count-down timer 6010 before it starts to attempt a search for another player for the team (FIG. 6*a*). The team building server 1100 may also provide an estimated wait time to find a new player for the team. The team building server 1100 may indicate that a new player is being searched for (FIG. 6*b*). When a new player 6020 has been found for the team (FIG. 6*c*), the champion, role and position of the new player are displayed in the team member list 2001. The new player's champion (avatar) is also shown in the map 2030. The window 2080 will provide an updated message showing the new player has just entered the team (FIG. 7*a*).

Figure 7A:
FIG. 7a is another exemplary Team Builder Lobby user interface according to an embodiment of the present invention.
Figure 7B:
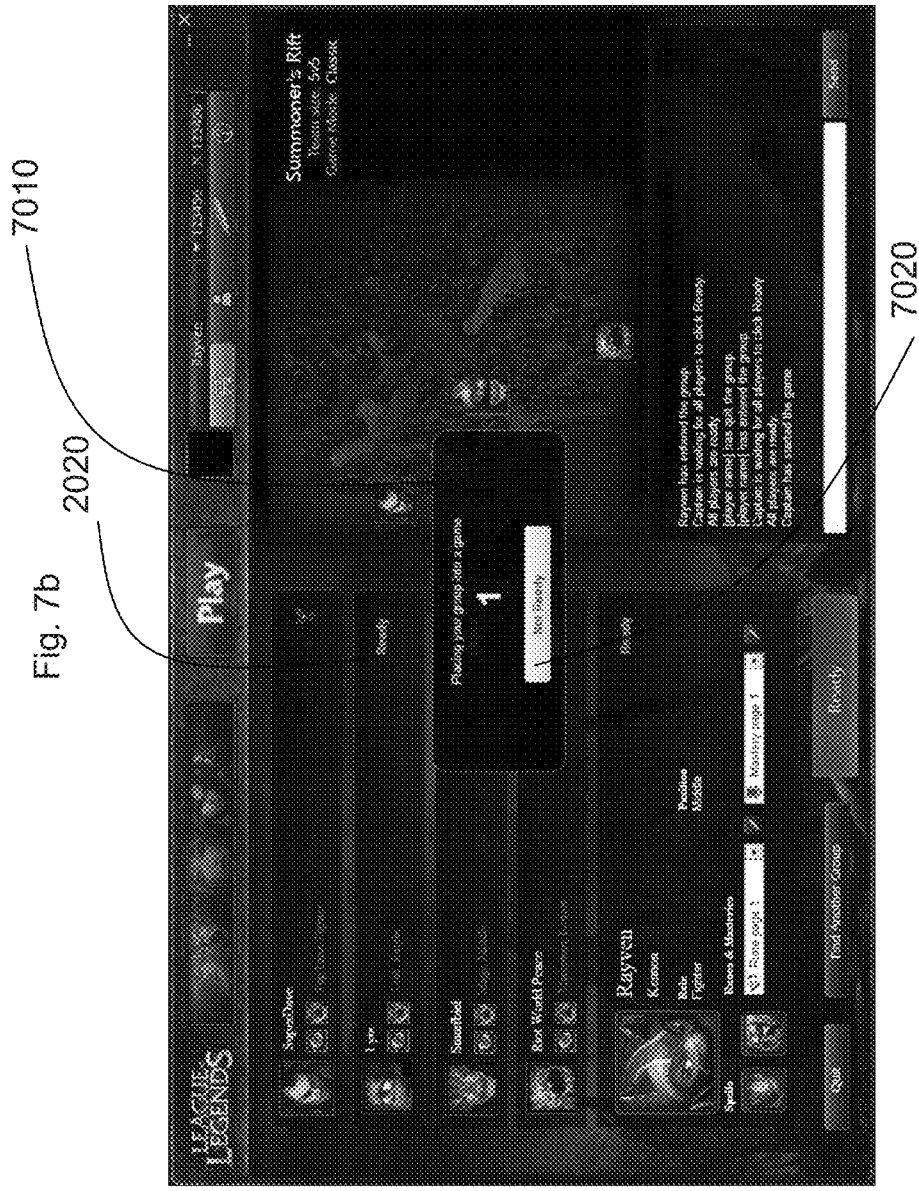
FIG. 7b is another exemplary Team Builder Lobby user interface according to an embodiment of the present invention.

Turning to FIG. 7*a* and FIG. 7*b*, when all team members have selected the Ready button 2060, the Ready/Not Ready status 2020 for each team member will show as Ready (FIG. 7*b*). When all team members are ready, the captain of the team may initiate matchmaking (as will be described in more detail below) wherein the team building server 1100 will find an opposing team. When the team building server 1100 finds an opposing team, a counter 7010 will start counting down from a predetermined number of seconds, e.g., 5 seconds. After the counter 7010 counts down to zero, the team building server 1100 places the team into a game. Any team member can cancel the countdown by selecting the Not Ready 7020 option. The cancellation of the countdown will put all members of the team back into the Not Ready status 2020.

Finding a Team as a Premade Group

It is noted that a player may be a captain. A player may opt to be a team captain or invited to be one based on the player's history or support from other players. As shown in FIG. 4*a*, a captain may select the Create a Group button 1222 to build a team. According to an embodiment, after the captain selects the Create a Group button 1222, the team building server 1100 also provides the captain with user interfaces 1300 to 1800, as shown in FIG. 4*b* to FIG. 4*g* above, so that the captain may also select his avatar, role, position, spells, runes, masteries, and so on. As such, this process is similar to that of the solo queuer.

Figure 8A:
FIG. 8a is another exemplary Team Builder Lobby user interface according to an embodiment of the present invention.

Turning to FIG. 8*a*, a user interface 8000 provided by the team building server 1100 is shown. According to an embodiment, after the captain has selected his avatar, role, position, spells, runes, masteries, and so on, the team building server 1100 may require that the captain invite at least one friend (player) to form a group of at least two players, before the captain can use the team building function of the team building server 1100. The user interface 8000 provides the Invite button 8010 for the captain to invite at least one friend.

Figure 8B:
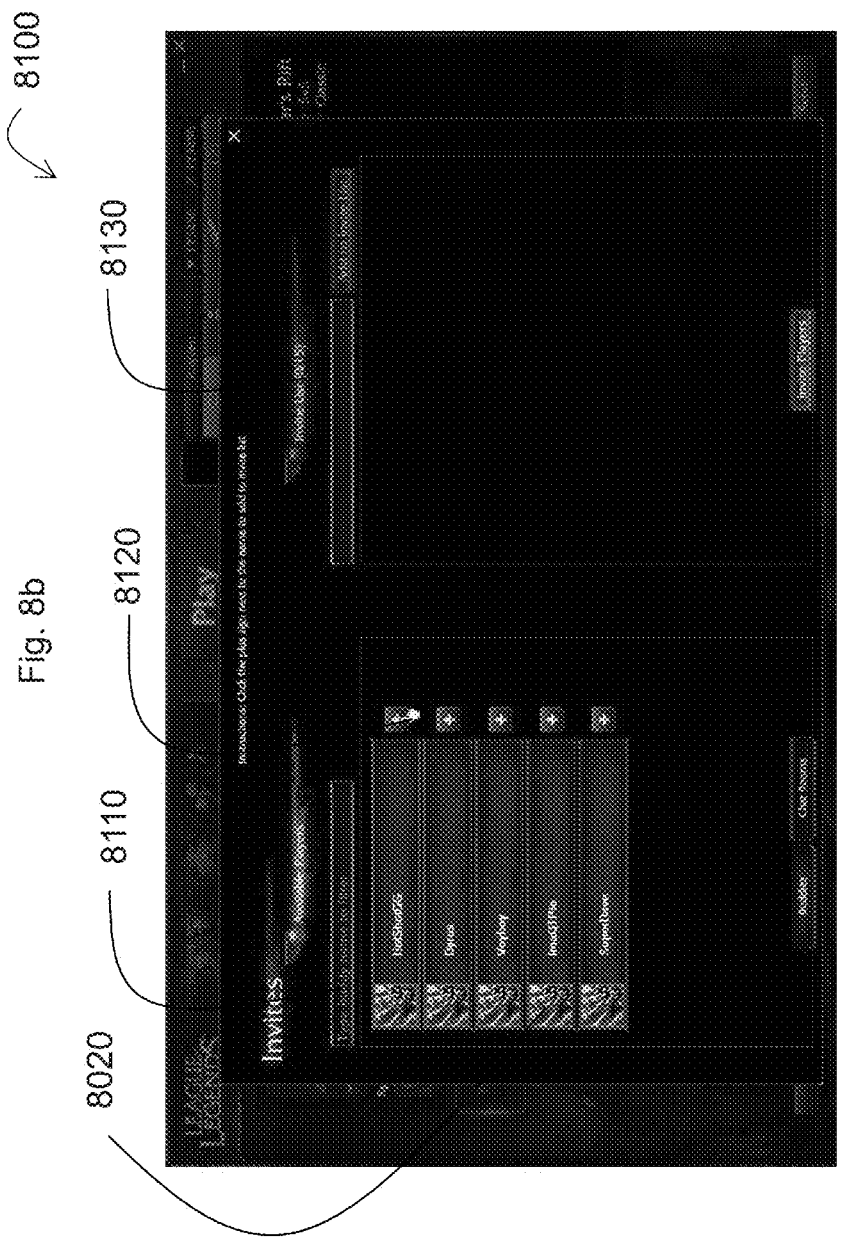
FIG. 8b is another exemplary Team Builder Lobby user interface according to an embodiment of the present invention.
Figure 8C:
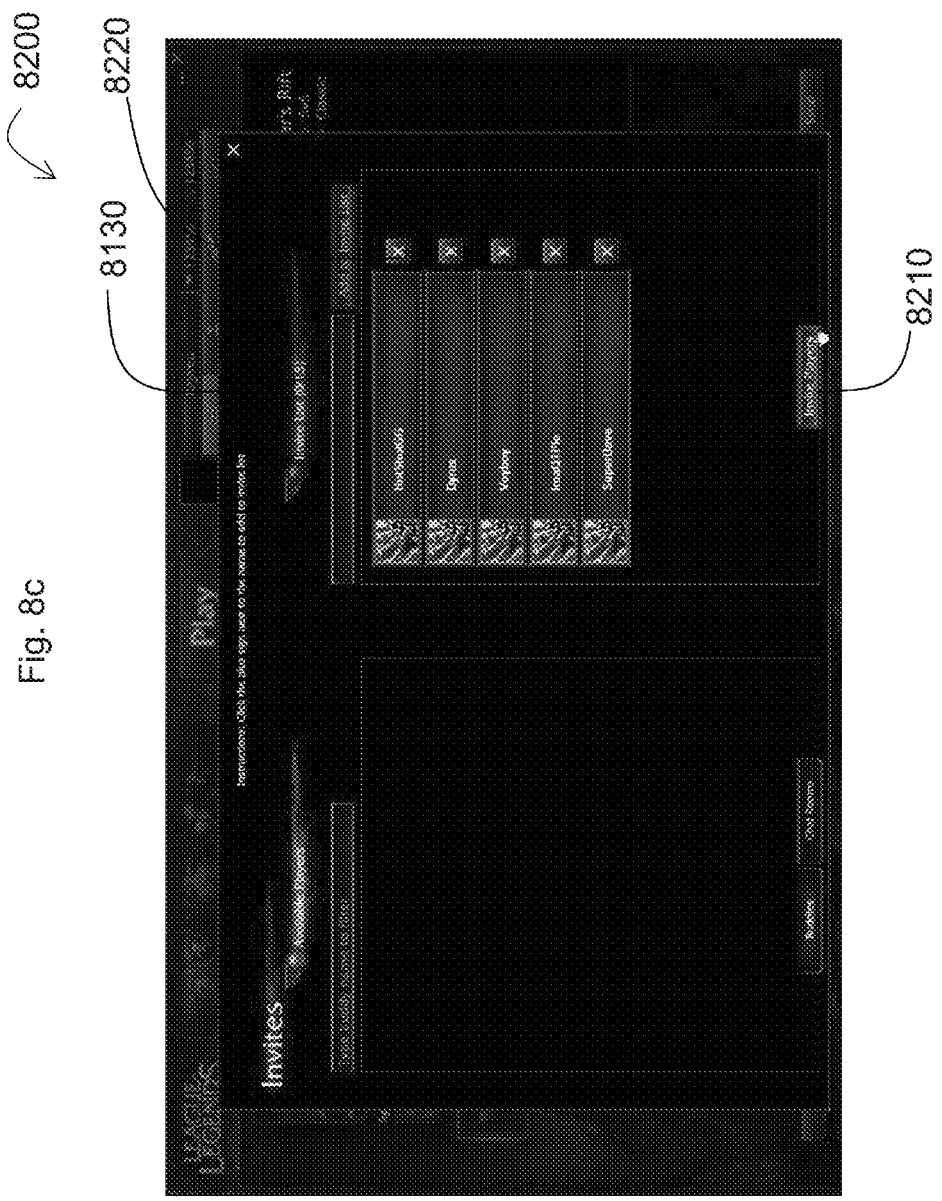
FIG. 8c is another exemplary Team Builder Lobby user interface according to an embodiment of the present invention.

Turning to FIG. 8*b* and FIG. 8*c*, the user interfaces 8100 and 8200 are provided by the team building server 1100 after the captain selects to invite at least one friend. The captain may type a name in the window 8110. The team building server 1100 will search for the friend and display the found friend in the Available Players list 8020. According to an embodiment, the team building server 1100 retrieves and displays all the friends of the captain in the Available Players list 8020. To invite a particular friend, the captain first selects the friend's name or an Add button 8120, e.g., a plus sign. The team building server 1100 will then add the friend to the Invite List 8130 (FIG. 8*c*). When the captain has found one or more friends that the captain wants to invite, with their names shown in the Invite List 8130, the captain may select the Invite Players button 8210 to initiate the invitation. The captain may also remove a friend from the Invite List 8130 by selecting the Remove button 8220, e.g., an X sign.

Figure 9:
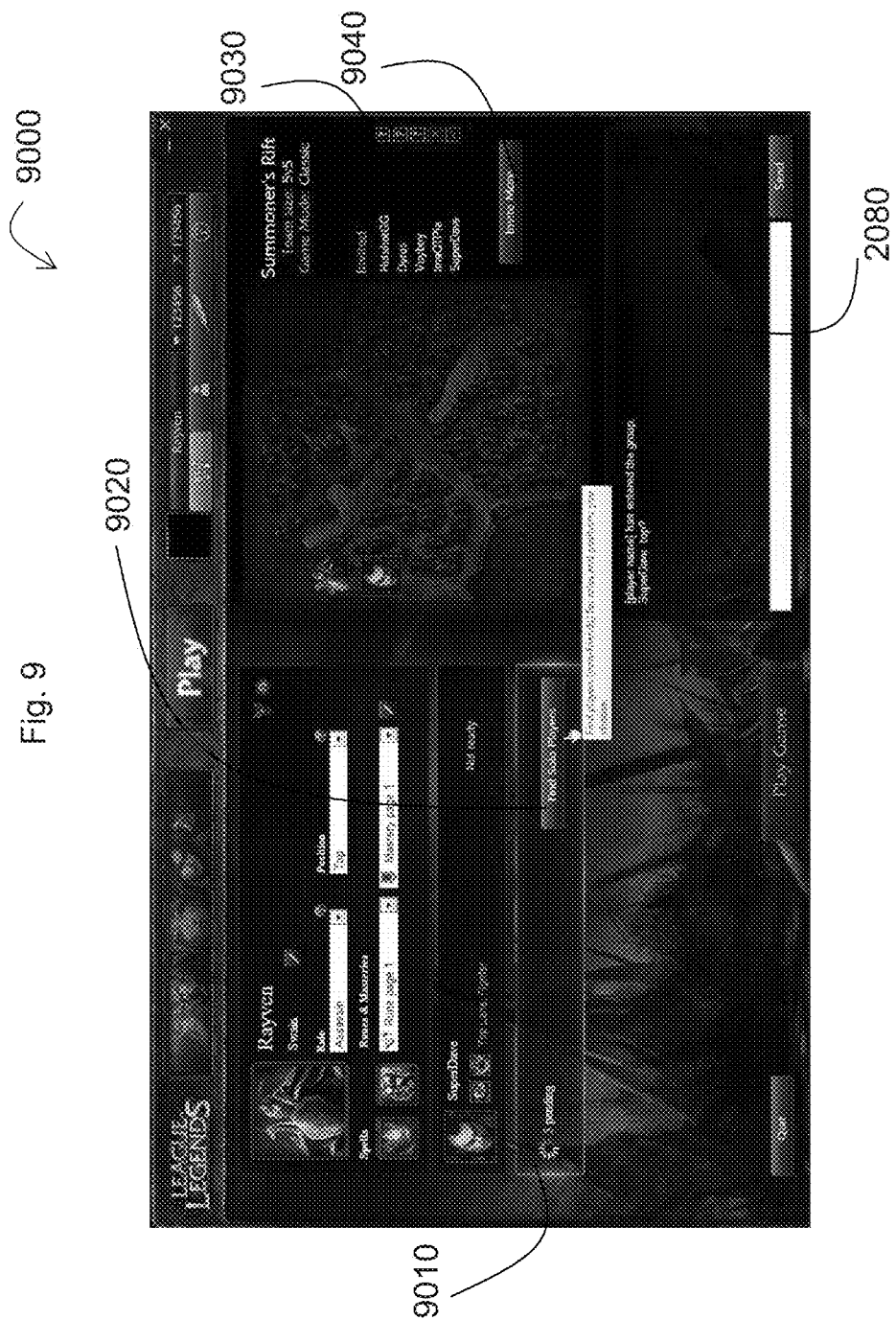
FIG. 9 is another exemplary Team Builder Lobby user interface according to an embodiment of the present invention.

Turning to FIG. 9, a user interface 9000 provided by the team building server 1100 is shown. After the captain initiates the invitation as shown in FIG. 8*c*, the team building server 1100 returns the captain to the user interface 9000, showing the invited friends in the Invited list 9030. In the example in FIG. 9, the friend "SuperDave" has accepted the invitation. A window 9010 shows the number of team members still needed for the team. For example, in a game session with the team size of five, and the team already has the captain and a friend, the window 9010 will show 3 more members are needed, e.g., "3 pending." The captain may select the Invite More button 9040 to attempt inviting more friends. Alternatively, the captain may select the Find Solo Players button 9020 to find other players for the team.

According to an embodiment, to find other solo players for a team, the team building server 1100 requires that the team must already have at least two members, also referred to as a premade group, e.g., a captain and another invited friend. Once a friend accepts the invitation, the friend is required to select a role and a position. The roles and the positions of the captain and the invited friend are locked when the captain selects the Find Solo Players button 9020 to initiate the search for other players. A captain can remove invited friends from the Team Builder Lobby. However, if the captain removes all friends from the lobby, the team building server 1100 may prevent the captain from proceeding to find solo players as a solo captain. For example, the team building server 1100 may shut down the Team Builder Lobby. One reason for shutting down the lobby when a captain removes all friends from the lobby is because of certain toxic or negative behaviors being displayed in the chat window 2080.

Figure 10:
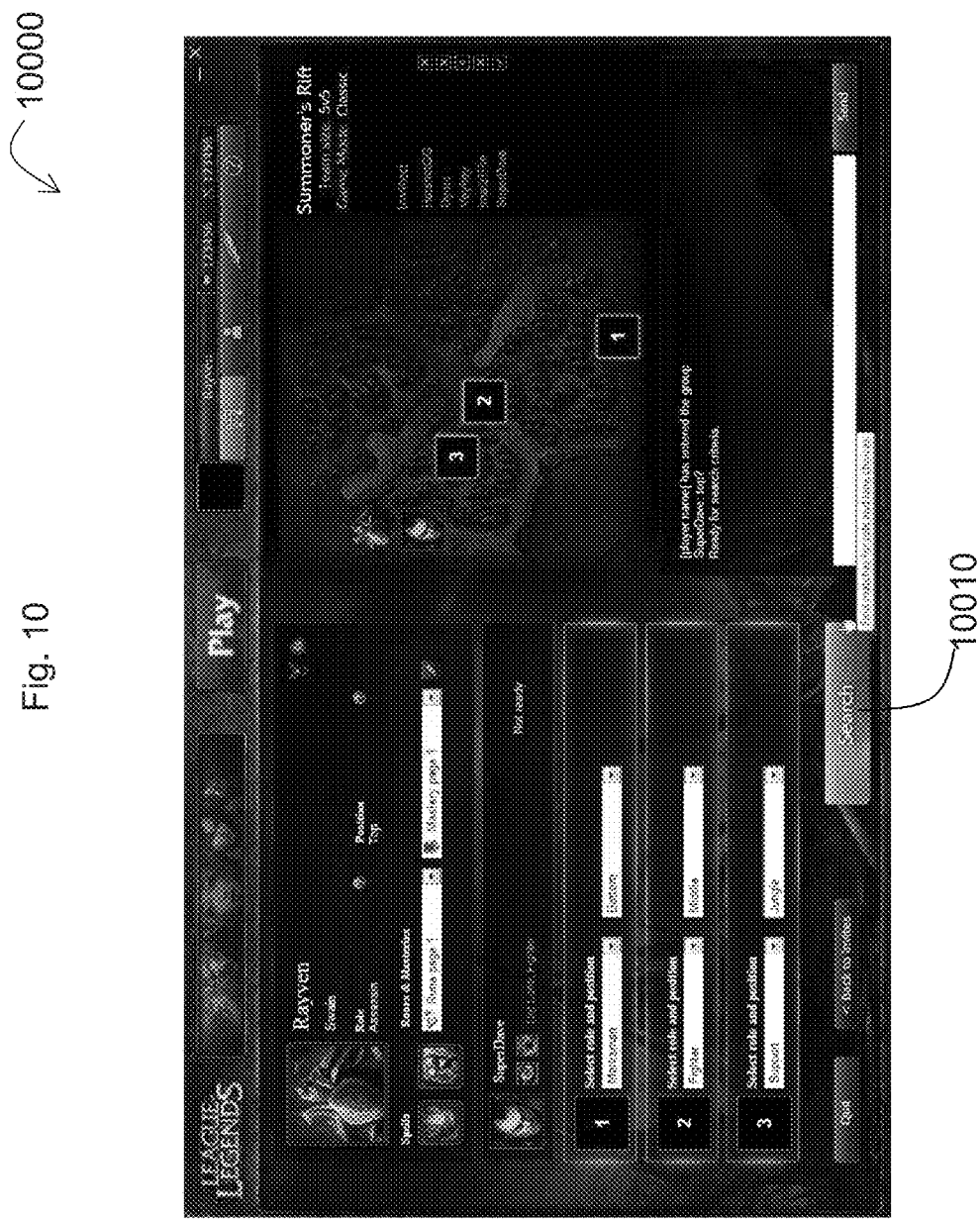
FIG. 10 is another exemplary Team Builder Lobby user interface according to an embodiment of the present invention.

Turning to FIG. 10, when the captain selects the Find Solo Players button 9020, the user interface 10000 is provided by the team building server 1100 for the captain to select the desired roles and positions of the missing team members. After selecting the desired roles and positions, the captain may select the Search button 10010 to initiate the search for solo players with the matching desired roles and positions. In one embodiment, a captain only needs to select the desired role and position for one other position before initiating a search for solo players. In such an embodiment, the team building server 1100 will attempt to match a player with the open position without regard to role.

In an embodiment, when there are one or more open slots in the team, the team building server 1100 may provide a "cool-down" countdown timer (not shown), e.g., 15 seconds. When this timer reaches zero, the team building server 1100 will start the search for solo players matching the desired roles and positions. For each player that the captain declines, or each invited friend that the captain removes from the Team Builder Lobby, the electronic cool-down timer's start value increases by a predetermined amount, e.g., one second, up to a cap limit, e.g., 30 seconds. The cool-down timer may be global. Or there may be associated timers each associated with an open slot. The cool-down timer's start value may be reset with a new Team Building Lobby. For example, if the cool-down timer starts at 0 second, if the captain declines three players and kicks two players, the count-down timer may increase to 5 seconds. In an example, as the captain declines a player, a slot becomes open. The cool-down timer starts to count down. When it reaches zero, the team building server 1100 starts searching for a new player.

Figure 11:
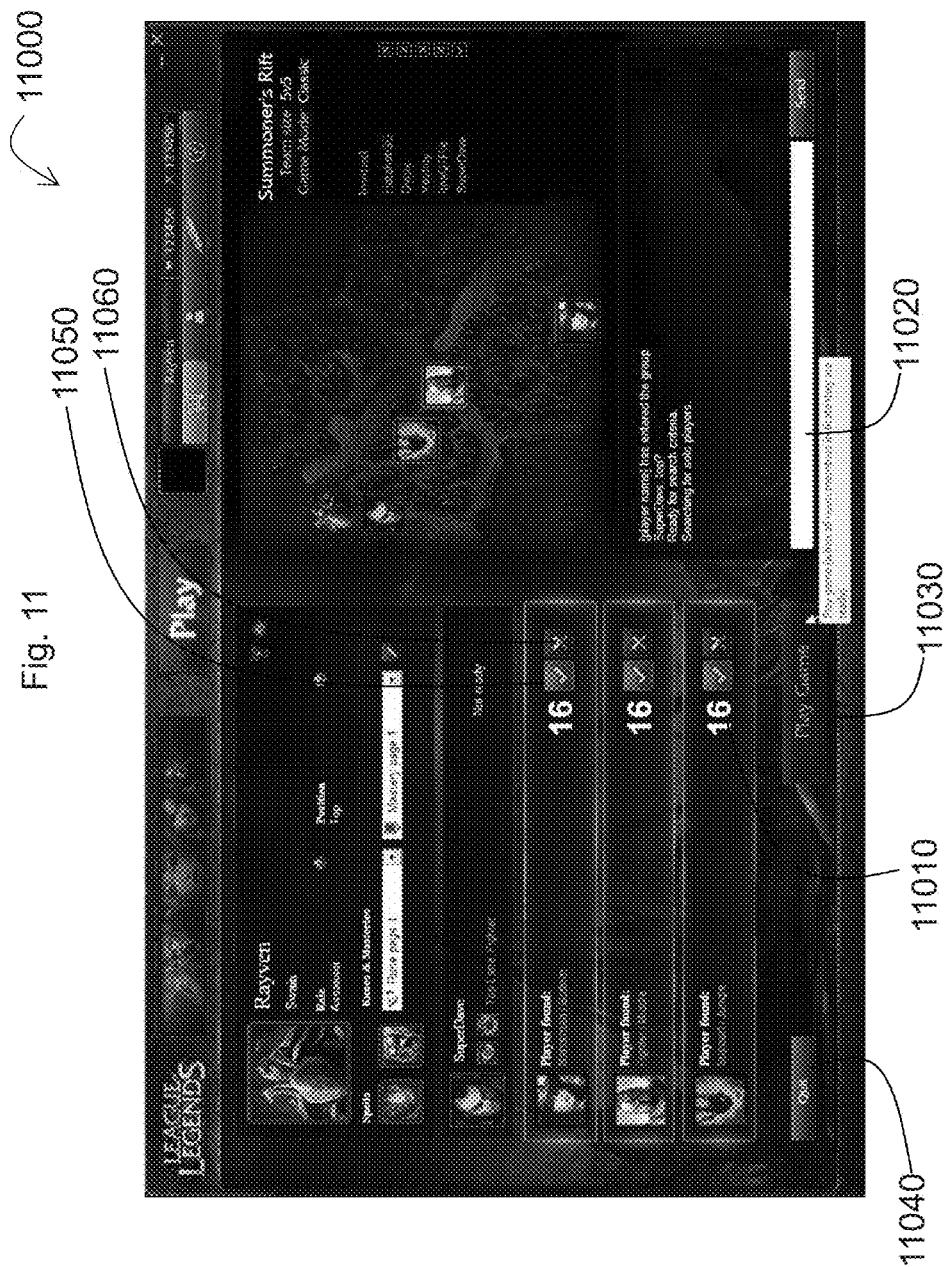
FIG. 11 is another exemplary Team Builder Lobby user interface according to an embodiment of the present invention.

Turning to FIG. 11, a user interface 11000 is provided by the team building server 1100 when the team building server 1100 has found matching players for the team. For each matching player found, the team building server 1100 displays the name, role and position of the new player, and provides a counter 11010 for the captain to decide whether to accept or decline the new player. If the captain does not make a decision when the counter expires (counts down to zero), the team building server 1100 may default to decline (auto-decline), and initiate another search for a player with role and position matching those of the declined player. Alternatively, the team building server 1100 may default to acceptance (auto-accept) if the captain does not make a decision when the counter expires. According to an embodiment, if a predetermined number of auto-declines is reached, the team building server 1100 may close the Team Builder Lobby and may send the captain a message. In this situation, the team building server 1100 may keep records of the number of auto-declines in the captain's profile in the user profile database 1110.

When a player is declined, either by auto-decline or by the captain, that player may not be aware that he is suggested to the captain and is declined, and remains in the solo queue. When a player is accepted, the team building server 1100 places that player in the Team Builder Lobby. The accepted player may chat with other team members via the Chat window 11020. According to an embodiment, only the captain can accept or decline players. Alternatively, the team building server 1100 may allow one or more suggested team members to accept or decline players. For example, the team building server 1100 may allow for a vote by the existing team members on whether or not to admit new players. When a player is accepted, the player is slotted into the Team Builder Lobby and can begin chatting with other team members. The visual presentation of the player may change to indicate that the player has been accepted.

When a player is declined, the team building server 1100 may exclude that player's avatar from further suggestion to the same team. For example, if the captain is searching for a marksman-bottom, and if the team building server 1100 suggests a player having Ashe as avatar (champion) and marksman-bottom, but the captain declines that player, the team building server 1100 may not suggest anymore Ashe players to the team.

The captain declines a player by selecting the decline button 11060, or accepts a player by selecting the accept button 11050. Once the captain has accepted all players, the captain may select the Play Game button 11030 to start the game with the current team. For each player, the team building server 1100 saves the player's champion, role, position, spells, rune and mastery pages in the player's profile in the user profile database 1110. The team building server 1100 may use these as default selections when a solo player enters the Team Building Lobby next time, also referred to as re-queuing. Alternatively, the team building server 1100 may save the information as soon as a solo player queues up. In this way, the information is saved even if the player quits the lobby before a team is found, or before the game starts.

When a captain re-queues as a captain, and wants to build another team, the team building server 1100 may default the captain's champion, role, position, rune page, mastery page and summoner spells to the previous selection as saved in the captain's profile. As a result, the captain may immediately start inviting friends to the Team Builder Lobby. The team building server 1100 may also default the invited friends' champions, roles, positions, rune pages, mastery pages and summoner spells to the previous selections as saved in the friends' profiles. However, the friends may select to change any of their default selections. As described above, the captain may now select the Find Solo Players button 9020 (FIG. 9), which locks in the captain's and friends' selections. The team building server 1100 then takes the current participants in the lobby and compare with the captain's previous lobby configuration. For example, if the previous configuration has a mage-middle, marksman-bottom, support-bottom, fighter-top, tank-jungler, and the current configuration of captain+two friends has a mage-middle, marksman-bottom and support-bottom, then the team building server 1100 automatically selects fighter-top and tank-jungler for the remaining slots. If the team building server 1100 cannot match a current champion/position combination with one of the previous configuration's options, then the captain may manually setup the slots again.

Another example is illustrated below:

| Previous Configuration | Current Configuration | |
|---|---|---|
| Mage-Mid | Captain | Fighter-Top |
| Marksman-Bot | Friend 1 | Support-Bot |
| Tank-Jungler | Friend 2 | Marksman-Bot |
| Fighter-Top | | |
| Support-Bot | | |

| Team Builder automatically configures the remaining slots | | Final Composition | |
|---|---|---|---|
| Random 1 | Mage-Mid | Captain | Fighter-Top |
| Random 2 | Tank-Jungler | Friend 1 | Support-Bot |
| | | Friend 2 | Marksman-Bot |
| | | Random 1 | Mage-Mid |
| | | Random 2 | Tank-Jungler |

The team building server 1100 saves the configuration in the captain's profile after the captain selects the Find Solo Players button 9020 and before the system starts the search for matching solo queuers. For example, the team building server 1100 will not save any configuration while the captain is inviting friends, as the invited friends may quit before the team composition has been locked in. However, when the captain sets the team composition and selects the Find Solo Players button 9020 to start searching for solo queuers, the team building server 1100 will save the configuration.

According to an embodiment, if the team building server 1100 allows a solo player to be team captain, e.g., with a minimum number of one member, the team building server 1100 still saves the configuration.

Penalties.

It is noted that all user interfaces provided by the team building server 1100 have an option similar to the Quit option 11040 so that any player, including the captain, may select to leave the Team Builder Lobby at any time. However, according to an embodiment, the team building server 1100 may establish associated penalties when players leave a predetermined number of lobbies within a predetermined period of time, or when captains decline a predetermined number of players within a predetermined period of time. The team building server 1100 may also apply these penalties when a friend leaves a captain's lobby, for example, to prevent a friend (as captain) escape penalty by having another friend leave the Team Builder Lobby to restart the search process.

In an embodiment, when a lobby has had a predetermined number of players, e.g., 10, manually leave that lobby, the team building server 1100 "unlocks" this lobby so that other players may enter and leave this lobby without penalty. An example is when a captain has a very unorthodox or unusual team composition, the team building server 1100 does not penalize players for leaving such lobby. The team building server 1100 may provide a visual indication in one or more user interfaces herein to indicate that the lobby is unlocked.

The team building server 1100 may also implement Abuse penalties for all players. Each player starts with a default Group Finder Abuse (or "GFA") score of zero. This is a global score which is stored in the player's profile, and persists across game sessions. Each time a player commits an abusive action during the team building (or Group Finder) process, that player's GFA score will increase by a predetermined amount. The amount may vary based on the type of abusive action. When a player's GFA score reaches a predetermined limit, e.g., 1000, the team building server 1100 may place that player in timeout mode, during which time that player may not use the team building feature. The timeout period may be a predetermined length of time, e.g., three hours. In an embodiment, the team building server 1100 may decrease the player's GFA score by a predetermined amount when placing that player in timeout mode.

On the other hand, each time the player performs an action which helps move along the team building process, that player's GFA score will decrease by a predetermined amount, also referred to as GFA Decay. The amount may vary based on the type of action. In an embodiment, the team building server 1100 may also implement GFA Decay when the player plays game sessions not via the Team Builder Lobby.

If a captain's GFA score reaches a high limit, e.g., 1000, while using the Team Builder Lobby, the team building server 1100 may allow the game to still proceed and finish, and apply penalties at the end of the game session.

The GFA score may become negative and is capped when it reaches a predetermined negative score. According to an embodiment, the team building server 1100 may not activate the GFA function, and allows a system administrator to toggle the GFA function on or off. All the predetermined amounts, limits, and hours mentioned herein may be configurable by a system administrator. Examples of these predetermined amounts and limits are, but not limited to:

GFA Adjustments

Captain Perspective

Captain manually "Declines" a player=GFA+1

Captain away from keyboards (AFKs) and "Declines" a player=GFA+2

Captain manually "Kicks" a player=GFA+3

Captain manually "Accepts" a player=GFA−1

Captain abandons the group and exits Team Builder=GFA+4

Captain successfully completes a game via Team Builder=GFA−5

Captain away from keyboard (AFKs) and players leave lobby=GFA+6

Solo Perspective

Solo manually leaves a Team Builder lobby and exits Team Builder=GFA+3

Solo manually re-queues for another group=GFA+8

Solo manually declines a group that has accepted them=GFA+1

Solo AFKs and "Declines" a group=GFA+2

Solo successfully completes a Team Builder game=GFA−5

Friend Perspective

Friend abandons the group and exits Team Builder=GFA+5

Friend successfully completes a game via Team Builder=GFA−2

After a game session, which was started via the Team Builder Lobby, if the captain selects the Play Again button (not shown), the team building server 1100 will present a pop-up to the other players re-inviting them to a new Team Builder Lobby. For example, the pop-up may comprise "Would you like to play another Group Finder match with the teammates from your last game?" In the Team Builder Lobby, the players will have their configurations defaulted to the previous team composition they played. If only a subset of the players join the new Team Builder Lobby, the team building server 1100 sets the remaining slots according to the re-queuing as a captain logic above. According to an embodiment, the team building server 1100 may not allow solo players and premade friends select the Play Again button.

In addition to using the role-position composition to find matching players, the team building server 1100 may use other metrics, e.g., summoner level, number of wins, number of times a player has played a champion, number of times a player has played a role in Team Builder, number of times a player has played a game via Team Builder, a player's Team Builder leave score, a player's captain decline score, a player's captain kick score, player's honor score, and so on. For each team formed via Team Builder Lobby, the team building server 1100 may calculate the averages for these metrics to find solo teammates. Once the team is fully formed, the team building server 1100 may re-calculate the averages for these metrics to find the opposing team. The team building server 1100 will attempt to find teammates (or opposing teams) as close to the averages as possible.

When there are many groups looking for new teammates, the team building server 1100 may prioritize groups that are almost complete, or closer to completion. There may be certain times when the entire Team Builder queue is full of solo queue players and a shortage of captains. In such situation, the average queue time of the entire system may exceed a time limit, e.g., 10 minutes, due to a gross mismatch in the availability of captains and solo players, the team building server 1100 may allow solo players to become captains and create lobbies. The team building server 1100 presents a pop-up message asking the players whether they would like to be captain with the ability to set a team composition and recruit teammates.

The team building server 1100 may also keep performance metrics, or key performance indicators (KPIs). These metrics include, but are not limited to, average time to successfully build and start a game, team building failures, percentage of successes, average time to find a viable candidate, aggregated metrics of players that fail out of a team, activities and/or events that occur during team building (e.g., candidates suggested, declined, accepted, removed, etc.), average time before a team accepts a particular combination/composition (e.g., champion-role-position), number of declines/accepts/kicks per slot, number or average number of teams a player joins before settling in a team, events that compose a player's GFA score, and so on.

Figure 12:
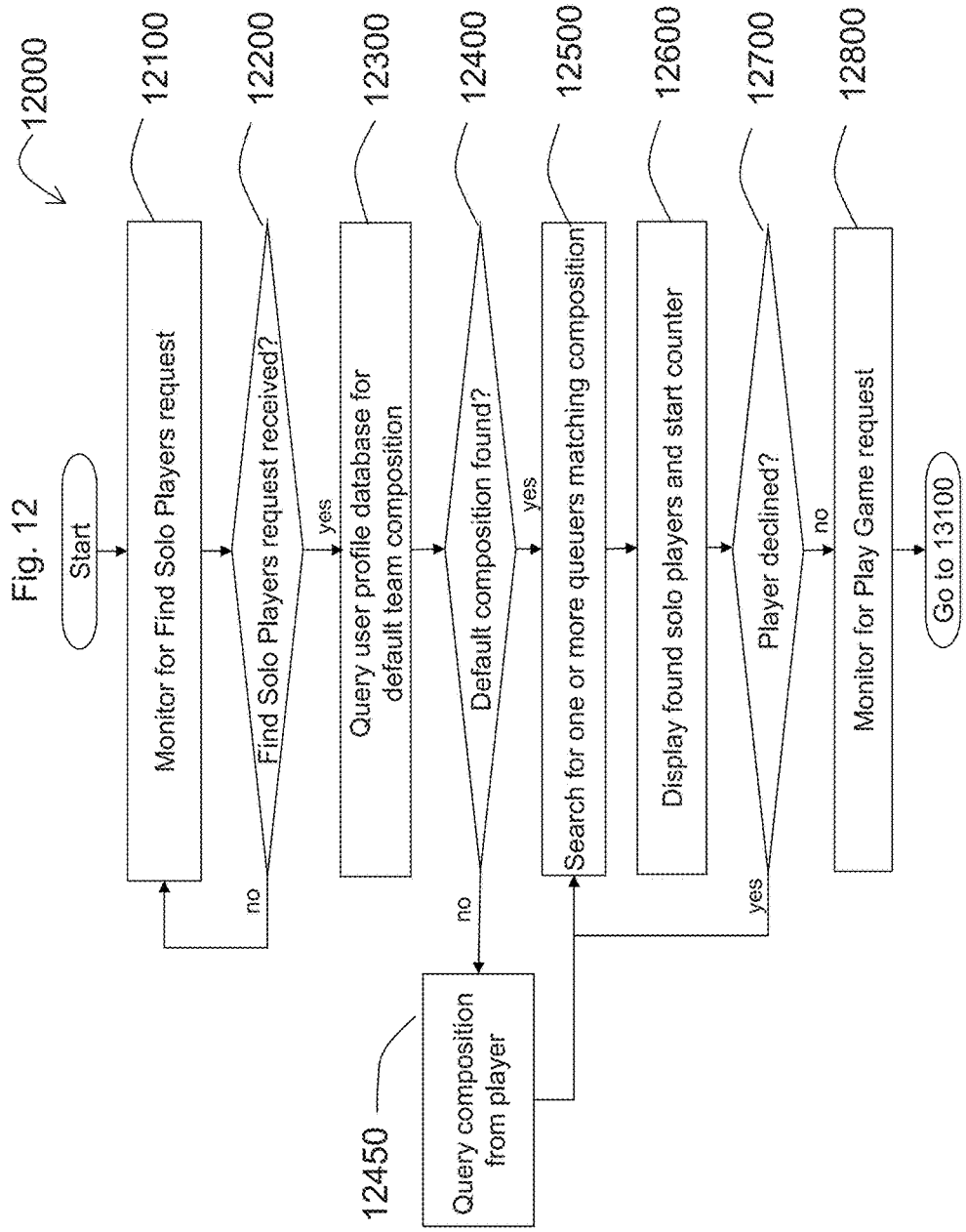
FIG. 12 is an electronic process enabling team building for multiuser online games according to an embodiment of the present invention.

Turning to FIG. 12, a flowchart 12000 illustrating an operation of the team building server 1100 as described above is shown. The team building server 1100 monitors for a Find Solo Players request from a captain as described in FIG. 9 above (Action Block 12100). When the Find Solo Players request is received (Decision Block 12200), the team building server 1100 queries the captain's profile in the user profile database 1110 for team composition that may have been saved from previous team building session (Action Block 12300). If a saved team composition is found (Decision Block 12400), the team building server 1100 uses the saved team composition as the default team configuration and starts the search for other players (Action Block 12500). If a team composition has not been saved, the team building server 1100 queries the captain for the team configuration, as described in FIG. 10 above (Action Block 12450).

When the team building server 1100 has found one or more players with the matching composition for the team, the team building server 1100 displays the suggested players and starts the countdown counter as described in FIG. 11 above (Action Block 12600). If any suggested player is declined by the captain or by auto-decline (Decision Block 12700), the team building server 1100 goes back to search for other players (Action Block 12500). If all suggested players are accepted by the captain or by auto-accept, the team building server 1100 monitors for a Play Game request (Action Block 12800).

Turning to FIG. 13, a flowchart 13000 illustrating an operation of the team building server 1100 as described above is shown. When the team building server 1100 receives an electronic Play Game request, the team building server 1100 saves each player's composition (champion, role, position, and so on) in the player's profile in the user profile database 1110 (Action Block 13100). The team building server 1100 also saves the team composition in the captain's profile (Action Block 13200), and saves each player's activities, behavior, and any other metrics in the player's profile (Action Block 13300). Based on the player's activities and behavior, the team building server 1100 calculates penalties, scores, and any other metrics and save them in the user profile database (Action Block 13400). After the team building server 1100 calculates and saves all data, the team building server 1100 transmits or transfers the game to the game session server 140 (Action Block 13500).

In a system 1000 having millions of active players at any given time, the team building server system 1100 described above may involve millions of data points to calculate. Thus, according to an embodiment, when a user logs in to find or create a team, the user's activities and behavior data may immediately be cached into an in-memory system database known in the art for fast access and fast calculations to enable seamless team building.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for online gaming systems; however, the invention can be used for any multi-user online system in general. Additionally and obviously, features may be added or subtracted as desired. Accordingly, the invention is not to be restricted except in light of the attached claims and their equivalents.

What is claimed is:

1. A massively multiplayer online multiuser game system, comprising:
    an online game session server system communicatively coupled to a network for access by a plurality of users to establish a plurality of interactive game sessions, wherein each game session includes at least one team;
    an online team building server operatively coupled to the online game session server system that enables a first user to define a preferred team composition of users for a first team;
    a user profile database stored on a non-transitory computer-readable medium and coupled to the online game session server system and the team building server including an electronic profile associated with each of the plurality of users; and
    instructions stored in non-transitory memory that, when executed by a processor, cause the processor to:
        calculate a queue time for a second user based on any applicable penalties, a game type option, and an avatar composition as selected by the second user, wherein the avatar composition includes an avatar, a role for the avatar, and at least one attribute associated with the role; and
        transmit, via the network, the queue time to a user device of the second user for display via a user interface of the user interface device,
        wherein penalties are calculated based on information in the second user's profile;
    wherein the online team building server, during operation, adds the second user to the first team if:
        a game type option for the game session matches the game type option selected by the second user;
        the second user's avatar composition complies with requirements of the preferred team composition for the first team as defined by the first user; and
        the online team building server receives a selected acceptance indication from the second user.

2. The system of claim 1, wherein penalties are further calculated based on at least one of: the user leaving a predetermined number of teams and leaving at least one team within a predetermined amount of time.

3. The system of claim 1, wherein the preferred team composition can be defined, at least in part, by the minimum, maximum, or both the minimum and maximum number of users on the team.

4. The system of claim 1, wherein a user's profile includes behavioral data associated with the user, and wherein penalties are defined, at least in part, by said behavioral data and their effect on queue times can be subject to decay functions.

5. The system of claim 1, wherein a user's profile includes historical data associated with the user, and wherein the preferred team composition can be defined, at least in part, by said historical data.

6. The system of claim 5, wherein said historical data includes data related to the first user's historical interactions with the second user.

7. The system of claim 1, wherein the preferred team composition can be defined, at least in part, by one or more specific user identifications.

8. The system of claim 1, wherein the first user may decline or accept the second user for addition to the first team created by the team building server.

9. The system of claim 1, wherein the team building server is further configured to send a request to one or more additional users to join the first team in accordance with the preferred team composition, and
    wherein the additional requested users may decline or accept said request.

10. The system of claim 9, wherein the team building server is further configured to send one or more requests to one or more alternative users in response to the second user declining the first team or the first user declining the second user.

11. A massively multiplayer online server system having one or more processors communicatively coupled to a network and configured to provide access to a plurality of users to establish a plurality of interactive game sessions, wherein each game session includes at least one team of users, said system comprising:
    a user profile database stored on a non-transitory computer-readable medium including an electronic profile for each of the plurality of users; and
    a non-transitory computer-readable medium with a sequence of instructions which, when executed by the one or more processors, causes said one or more processors to execute an electronic process that:
        enables a first user to selectively define a preferred team composition of users for a first team using a first user device;
        enables a second user to select a game type option and selectively define an avatar composition including an avatar, a role for the avatar, and at least one attribute associated with the role using a second user device;
        calculates a queue time for the second user based on any applicable penalties, the selected game type option, and the avatar composition selected by the second user, wherein penalties are calculated based on information in the second user's profile;
        transmits the queue time to the second user device for display;
        determines whether the second user's avatar composition is in compliance with the preferred team composition; and
        adds the second user to the first team if a type option for the game session matches the game type option selected by the second user, the second user's avatar is in compliance with the preferred team composition, and the second user accepts the first team.

12. The system of claim 11, wherein penalties are calculated based on at least one of: the user leaving a predetermined number of teams and leaving at least one team within a predetermined amount of time.

13. The system of claim 11, wherein the preferred team composition can be defined, at least in part, by the minimum, maximum, or both the minimum and maximum number of users on the team.

14. The system of claim 11, wherein a user's profile includes behavioral data associated with the user, and wherein penalties are defined, at least in part, by said behavioral data and their effect on queue times can be subject to decay functions.

15. The system of claim 11, wherein a user's profile includes historical data associated with the user, and wherein the preferred team composition can be defined, at least in part, by said historical data.

16. The system of claim 15, wherein said historical data includes data related to a first user's historical interactions with the second user.

17. The system of claim 11, wherein the preferred team composition can be defined, at least in part, by one or more specific user identifications.

* * * * *